United States Patent
Fujimoto

[11] Patent Number: 5,890,183
[45] Date of Patent: Mar. 30, 1999

[54] METHOD, APPARATUS, ELECTRONIC DICTIONARY AND RECORDING MEDIUM FOR CONVERTING CONVERTED OUTPUT INTO CHARACTER CODE SET ACCETPABLE FOR RE-RETRIEVAL AS ORIGINAL INPUT

[75] Inventor: Masakazu Fujimoto, Nakai-machi, Japan

[73] Assignee: Fuji Xerox Co., Ltd., Tokyo, Japan

[21] Appl. No.: 614,019

[22] Filed: Mar. 12, 1996

[30] Foreign Application Priority Data

Mar. 13, 1995 [JP] Japan .................................. 7-052271
Jan. 5, 1996 [JP] Japan .................................. 8-000242

[51] Int. Cl.⁶ .................................................. G06F 17/21
[52] U.S. Cl. ...................... 707/540; 707/531; 707/532; 707/536; 707/542
[58] Field of Search ..................... 395/793, 794, 395/797, 798; 341/106; 707/536, 532, 539, 540, 542, 531

[56] References Cited

U.S. PATENT DOCUMENTS

| | | | |
|---|---|---|---|
| 5,255,355 | 10/1993 | Suzuki ................................... | 395/797 |
| 5,285,387 | 2/1994 | Kurahara et al. ....................... | 707/535 |
| 5,303,151 | 4/1994 | Neumann .................................... | 704/2 |
| 5,319,552 | 6/1994 | Zhong ..................................... | 395/797 |
| 5,351,189 | 9/1994 | Doi et al. ................................... | 704/3 |
| 5,359,707 | 10/1994 | Sato ........................................ | 707/532 |
| 5,389,924 | 2/1995 | Ogawa ................................... | 341/106 |
| 5,416,903 | 5/1995 | Malcolm ................................ | 345/333 |
| 5,530,644 | 6/1996 | Maruta et al. ............................... | 704/4 |
| 5,550,741 | 8/1996 | Nakajima ................................ | 707/540 |
| 5,574,840 | 11/1996 | Kwatinetz et al. ...................... | 707/531 |
| 5,587,902 | 12/1996 | Kugimiya .................................. | 704/2 |
| 5,594,642 | 1/1997 | Collins et al. .......................... | 707/535 |
| 5,608,622 | 3/1997 | Church ....................................... | 704/3 |
| 5,617,314 | 4/1997 | Zhong ................................... | 707/540 |

FOREIGN PATENT DOCUMENTS

A-2-67684  3/1990  Japan .
A-3-51958  3/1991  Japan .
A-4-10052  1/1992  Japan .

Primary Examiner—Joseph R. Burwell
Attorney, Agent, or Firm—Oliff & Berridge, PLC

[57] ABSTRACT

A different code string copying apparatus allows a converted output string to be converted into a code set that is reusable as an original input string. The apparatus includes an input buffer for storing a first string expressed by a first code set used in a first application process, an output buffer for storing a second string expressed by a second code set used in a second application process, a selection component that selects a part of the first string stored in the input buffer in accordance with a user's selecting instruction, a transfer instruction component that accepts the user's transfer instruction for the first string selected by the selection component, a storage component that associates the first string expressed by the first code set with the second string corresponding to the first string and expressed by the second code set and storing them, a retrieval component that retrieves the first string selected by the selection component from the first string expressed by the first code set and stored in the storage component in accordance with the transfer instruction accepted by the transfer instruction component, a character code conversion component that fetches a second string corresponding to the first string retrieved by the retrieval component and expressed by the second code set, and a transfer component that transfers the second string expressed by the second code set fetched by the character code conversion component to the output buffer.

8 Claims, 29 Drawing Sheets

INPUT BUFFER: LETTER

↓ INSTRUCTION OF RETRIEVAL

OUTPUT BUFFER: てがみ, もじ, ぶんがく, がくもん, ....

| CHARACTER OFFSET | CODE (HEXADECIMAL NUMBER) | CHARACTER |
|---|---|---|
| 1 | A4C6 | て |
| 2 | A4AC | が |
| 3 | A4DF | み |
| 4 | A1A2 | 、 |
| 5 | A4E2 | も |
| 6 | A4B8 | じ |
| 7 | A1A2 | 、 |
| 8 | A4D6 | ぶ |
| 9 | A4F3 | ん |
| 10 | A4AC | が |
| 11 | A4AF | く |
| 12 | A1A2 | 、 |
| 13 | A4AC | が |
| 14 | A4AF | く |
| 15 | A4E2 | も |
| 16 | A4F3 | ん |

FIG.7

10100100,11100010,10100100,10111000 (=A4E2A4B8)
ONLY LOWER 7 BITS ARE RECOGNIZED IN 8-BIT UNIT ⟶ $6$8
00100100,01100010,00100100,00111000(=24622438)
DIVIDE INTO EVERY 7 BITS ⟶ R8TK@
1010010,0111000,1010100,1001011,1000 (=5238544B40)

FIG.8

| INPUT FOR CONVERSION | OUTPUT AFTER CONVERSION |
|---|---|
| ひとつの | a |
| てがみ | letter |
| もじ | character |
| ぶんがく | literature |
| がくもん | scholarship |
| ちしき | knowledge |
| せいかく | personality |

INPUT BUFFER: character

↓ DESIGNATION OF RETRIEVAL

OUTPUT BUFFER: ひんかく，じんかく，もじ，‥‥

FIG.10

| CHARACTER OFFSET | CODE (HEXADECIMAL NUMBER) | CHARACTER |
|---|---|---|
| 1 | A4C6 | て |
| 2 | A4AC | が |
| 3 | A4DF | み |
| 4 | 002C | , |
| 5 | 006C | l |
| 6 | 0065 | e |
| 7 | 0074 | f |
| 8 | 0074 | t |
| 9 | 0065 | e |
| 10 | 0072 | r |
| 11 | A1A2 | 、 |
| 12 | A4E2 | も |
| 13 | A4B8 | じ |
| 14 | 002C | , |
| 15 | 0063 | c |
| 16 | 0068 | h |
| 17 | 0061 | a |
| 18 | 0072 | r |
| 19 | 0061 | a |
| 20 | 0063 | c |
| 21 | 0074 | t |
| 22 | 0065 | e |
| 23 | 0072 | r |
| 24 | A1A2 | 、 |

FIG.16

| CONVERSION REQUEST FLAG | CODE SIZE | CODE (HEXADECIMAL NUMBER) |
|---|---|---|
| 1 | 4 | A4E2A4B8 |

\*\*letter
[létə] 【名】《 【複】-s[-z]》
手紙
文字
(pl)文学,学問

FIG.24

\*\*letter
[létə] 【名】《 【複】-s[-z]》
手紙
文字
(pl)文学,学問

FIG.25

\*\*letter
[レタ] 【名】《 【複】-s[-ズ]》
手紙
文字
(pl)文学,学問

FIG.27

\*\*letter
[レタ] 【名】《 【複】-s[-ズ]》
手紙
文字
(pl)文学,学問

FIG.35

| CHARACTER OFFSET | CODE (HEXADECIMAL NUMBER) | FONT NUMBER | CHARACTER |
|---|---|---|---|
| 1 | 002A | 1 | * |
| 2 | 002A | 1 | * |
| 3 | 006C | 1 | l |
| 4 | 0065 | 1 | e |
| 5 | 0074 | 1 | t |
| 6 | 0074 | 1 | t |
| 7 | 0065 | 1 | e |
| 8 | 0072 | 1 | r |
| 9 | 000A | 1 | (CR) |
| 10 | 005B | 1 | [ |
| 11 | 006C | 251 | l |
| 12 | 0044 | 251 | D |
| 13 | 0074 | 251 | t |
| 14 | 0057 | 251 | W |
| 15 | 005D | 1 | ] |
| 16 | A1DA | 1 | 〔 |
| 17 | CCBE | 1 | 名 |
| 18 | A1DB | 1 | 〕 |
| 19 | A2E3 | 1 | ＜ |
| 20 | A1DA | 1 | 〔 |
| 21 | CAA3 | 1 | 複 |
| 22 | A1DB | 1 | 〕 |
| 23 | 002D | 1 | - |
| 24 | 0049 | 1 | s |

FIG.26

| : | - |
|---|---|
| ( | ( |
| ) | ) |
| , | , |
| - | - |
| ; | ; |

FIG.29

| a,à,á,ɑ,ɑ̀,ɑ́,ʌ,ʌ̀,ʌ́,ə,ə̀,ə́ | ア |
|---|---|
| i,ì,í | イ |
| u,ù,ú | ウ |
| ɛ,ɛ̀,ɛ́,e,è,é | エ |
| o,ò,ó,ɔ,ɔ̀,ɔ́ | オ |
| æ,æ̀,ǽ | エア,ヤ |

| b | ブ | p | プ |
|---|---|---|---|
| ʃ | シュ | ʒ | ジュ |
| d | ド | r | ル |
| f | フ | s | ス |
| g | グ | t | ト |
| h | フ | v | ヴ |
| j | ユ | w | ウ |
| k | ク | θ | ス |
| l | ル | ð | ズ |
| m | ム | z | ズ |
| n | ン | ŋ | ング |

FIG.32

| | NEXT CHARACTER | KATAKANA NOTATION |
|---|---|---|
| m | p,b,ʃ | ン |
| ŋ | k,g | ン |

FIG.33

|     | ア | イ | ウ | エ | オ | æ | NONE |
|-----|----|----|----|----|----|----|------|
| dʒ  | ジャ | ジ | ジュ | ジェ | ジョ | ジャ | ジュ |
| kw  | クワ | クィ | クゥ | クェ | クォ | クワ | クォ |
| hw  | ホワ | ホイ | ホウ | ホェ | ホォ | ホワ | ホウ |
| ts  | チャ | チ | チュ | チェ | チョ | チャ | ツ |
| tʃ  | チャ | チ | チュ | チェ | チョ | チャ | チ |

FIG.34

METHOD, APPARATUS, ELECTRONIC DICTIONARY AND RECORDING MEDIUM FOR CONVERTING CONVERTED OUTPUT INTO CHARACTER CODE SET ACCETPABLE FOR RE-RETRIEVAL AS ORIGINAL INPUT

BACKGROUND OF THE INVENTION

1. Field of the Invention

The present invention relates to a method and apparatus for reusing an output string as an inputting string. In particular, the invention relates to a method and apparatus for converting a special output character code into a character code set accepted as an inputting string and reusing it. One example of such an apparatus is an electronic dictionary for converting a special output character code such as phonetic symbols into an acceptable character code set for re-retrieval.

2. Discussion of Related Art

In an electronic dictionary, a string of a word to be retrieved is input by a keyboard, and a result of retrieval is displayed on a screen of a displaying device. There may be a case at this moment, for example, that the user wants to carry out a retrieval in the dictionary again for confirming the meaning of the word which has been output as a result of retrieval. In such a case, a conventional electronic dictionary requires the user to input again the string of the word to be retrieved by the keyboard, which results in poor operability.

As means for resolving the above problem, the Japanese Patent Application Unexamined Publication No. Hei. 3-51958 (1991) discloses an electronic dictionary capable of using a selected part of a displayed string as an input string for re-retrieval.

A recent operating system having a graphical user interface (hereinafter, referred to as GUI) can transfer data of an application process to another application process with ease by possessing a buffer called a clipboard for temporarily storing data.

However, in the case where the content to be transferred is a string, characters are changed into different characters which make no sense or are abnormally displayed. Therefore, the character string cannot be reused as an inputting string if the string is not expressed by a general code set or includes foreign characters unique to the application process. This also occurs even in the case of the general code set if there are differences among code sets used in application processes such as new Japanese Industrial Standards (JIS), old JIS, shift JIS or Extended Unix Code (EUC).

Therefore, some application processes prohibit selection of a part which has been output expressed by a special code as a string to be written in the clipboard. Some other application processes allow selection, but the selected part is limited to be written as image data. In the case of the phonetic symbols, some application processes can convert them into voice to be output, but it is not considered to be reused by other application processes.

So far, the conversion of the string has been executed at the inputting side. For example, Japanese Patent Application Unexamined Publication No. Hei. 2-67684 (1990) discloses an apparatus for rewriting notations of an input string having subtle differences between users so that it can be retrievable.

In this method, however, it is necessary to convert the input for each application process, and besides, the string which is not expressed by the general code set or foreign characters unique to an application process cannot be accepted. Accordingly, it is necessary to convert the string which is not expressed by the general code or foreign characters unique to the application process into the string expressed by the general code set at the side of the application process generating notation using such specific character code.

In a system employing the above-described clipboard, there are some application processes which prohibit selection of the part which has been output expressed by the special code such as the phonetic symbols as the string to be written in the clipboard, and some other application processes which allow selection, but the selected part is limited to be written as the image data. In the case of the phonetic symbols, some application processes can convert them into voice, but the phonetic symbol is not used again in re-retrieval.

As means for realizing retrieval using pronunciation, Japanese Patent Application Unexamined Publication No. Hei. 4-10052 (1992) discloses an electronic dictionary capable of retrieving using pronunciation represented by katakana, one of the two kinds of Japanese kana script used for syllabary writing. However, it is impossible to carry out the retrieval directly using the phonetic symbols; therefore the user is required to convert them into katakana before inputting process, which results in extremely poor operability.

SUMMARY OF THE INVENTION

The present invention has been made in view of the above circumstances. One object is to provide a different code string copying apparatus capable of preventing generation of an illegible string caused by change of characters for different ones or abnormal display of characters after transfer from one application process to another, even in a system or an application process in which a code set of a string in an output string is different from that of a string in an input string. The output string can be reused as the input string.

Another object of the present invention is to provide an electronic dictionary using the different code string copying apparatus capable of preventing an illegible string caused by change of characters for different ones or abnormal display of characters after transfer from one application process to another to carry out re-retrieval by using the output string as the input string even though a string whose code set is different from that of the input string, such as phonetic symbols, exists in the output string.

Additional objects and advantages of the invention will be set forth in part in the description which follows and in part will be obvious from the description, or may be learned by practice of the invention. The objects and advantages of the invention may be realized and attained, for example, by means of the instrumentalities and various combinations described herein.

To achieve the objects and in accordance with the purpose of the invention, as embodied and broadly described herein, a different code string copying apparatus according to the present invention comprises an input buffer for storing a first string expressed by a first code set used in a first application process, an output buffer for storing a second string expressed by a second code set used in a second application process, a selection component for selecting a part of the first string stored in the input buffer in accordance with user's selecting instruction, a transfer instruction component for accepting the user's transfer instruction for the first string selected by the selection component, a storing component for associating the first string expressed by the first code set with the second string corresponding to the first string and expressed by the second code set and storing them, a retrieving component for retrieving the first string selected by the selection component from the first string expressed by the first code set and stored in the storing component in accordance with the transfer instruction accepted by the transfer instruction component, a character code conversion component for fetching a second string corresponding to the first string retrieved by the retrieving component and expressed by the second code set, and a transfer component for transferring the second string expressed by the second code set fetched by the character code conversion component to the output buffer.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention. In the drawings:

FIG. 7 is an example of data in an output buffer representing the output string shown in FIG. 4 in the first embodiment;

FIG. 8 is an example in which the string selected as shown in FIG. 6 is transferred to an input buffer which does not correspond to a Japanese code and is changed for different characters in the first embodiment;

FIG. 9 is an example of a table for converting a selected word from the output string in the first embodiment;

FIG. 10 is an example of input/output in executing re-retrieval of a string which has been converted by the table shown in FIG. 9 and then transferred to the input buffer in the first embodiment;

FIG. 16 is an example of data in an output buffer representing the output string as shown in FIG. 4 in the second embodiment;

FIG. 24 is an example of the output of retrieval of the electronic dictionary in the third embodiment;

FIG. 25 is an example of display of a selection range in the case where the string is selected in the third embodiment;

FIG. 26 is an example of data in an output buffer representing an output string in the third embodiment;

FIG. 27 is an example of an output in the case where the output string is transferred to another apparatus in the third embodiment;

FIG. 29 is an example of a lookup table for a symbol conversion process;

FIG. 30 is an example of a lookup table for a vowel conversion process;

FIG. 31 is an example of a lookup table for a consonant-vowel conversion process;

FIG. 32 is an example of a lookup table for a normal single-consonant conversion process;

FIG. 33 is an example of a lookup table for a special single-consonant conversion process;

FIG. 34 is an example of a lookup table for a consonant-consonant conversion process;

FIG. 35 is an example of an output in the case where the output string is transferred to an input buffer;

DETAILED DESCRIPTION OF PREFERRED EMBODIMENTS

Preferred embodiments of a different code string copying apparatus and an electronic dictionary according to the present invention are now described in detail based on the drawings.

First Embodiment

Figure 1:
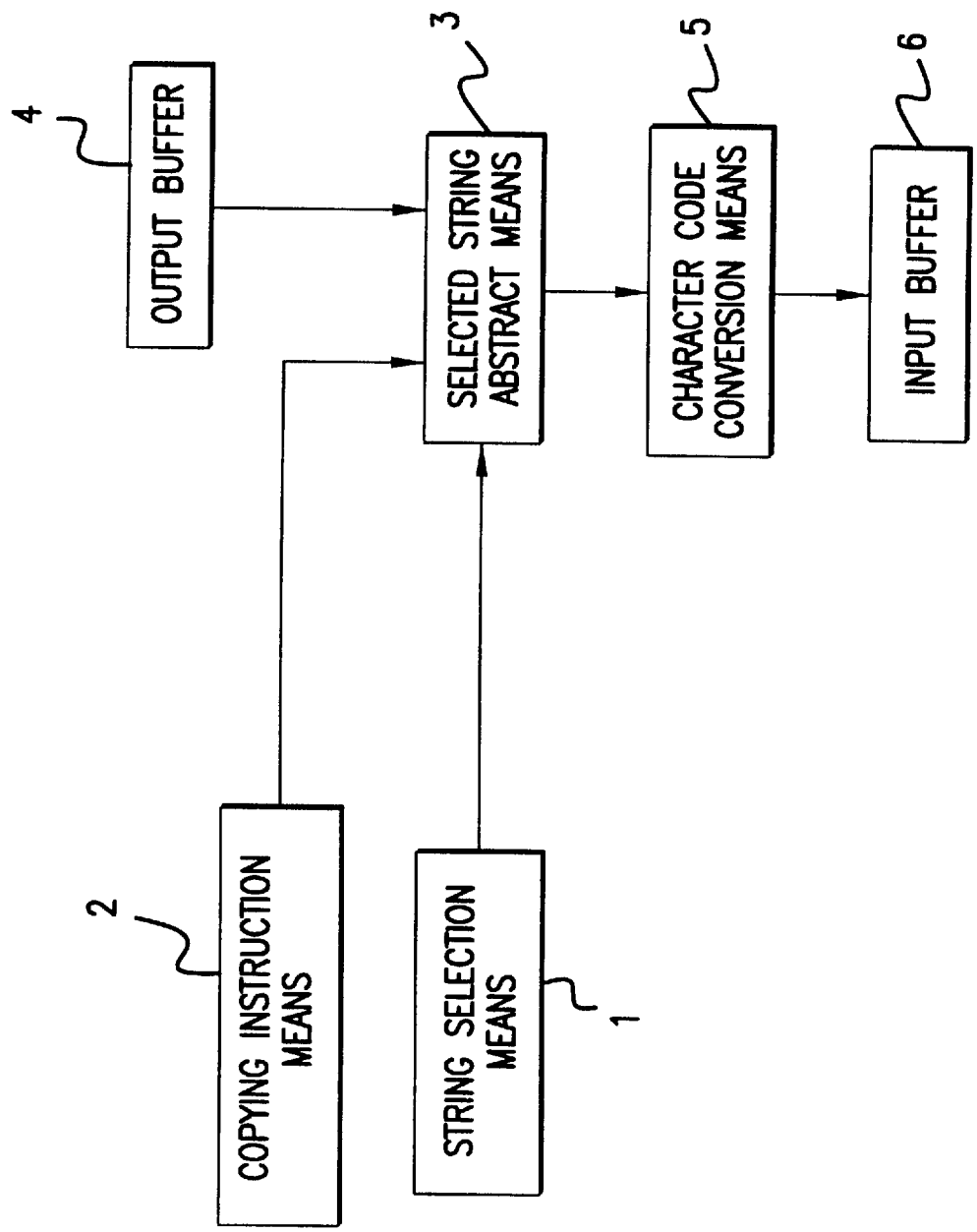
FIG. 1 is a block diagram showing a basic construction of a first embodiment of a different code string copying apparatus according to the present invention.

FIG. 1 is a block diagram showing basic construction of a first embodiment of a different code string copying apparatus according to the present invention.

Different code string conversion according to the present embodiment is carried out only in the case where foreign characters unique to the transferring side application process, namely, fonts only used in the application process (in this embodiment, phonetic symbols whose font number is 251) are transferred to another application process.

String selection means 1 enables the user to instruct a range of selection of a string. The string selection means may comprise an ordinary pointing device such as a mouse, a tracking ball, a digitizer or cursor keys. The range of the string may be input as a value of coordinates directly or as the number of characters from the starting point of the line. Copy instruction means 2 is provided for enabling the user to instruct copying operation or a copying mode. A function key on a keyboard, a button of mouse or a push button on display by the GUI can be utilized as the copy instruction means 2. Selected string abstract means 3 is provided for abstracting a character code of the string selected by the string selection means 1 from an output buffer 4. Character code conversion means 5 is provided for converting the character code of the string abstracted by the selected string abstract means 3 into a different set of character code. Converted character code is transferred to an input buffer 6.

Figure 2:
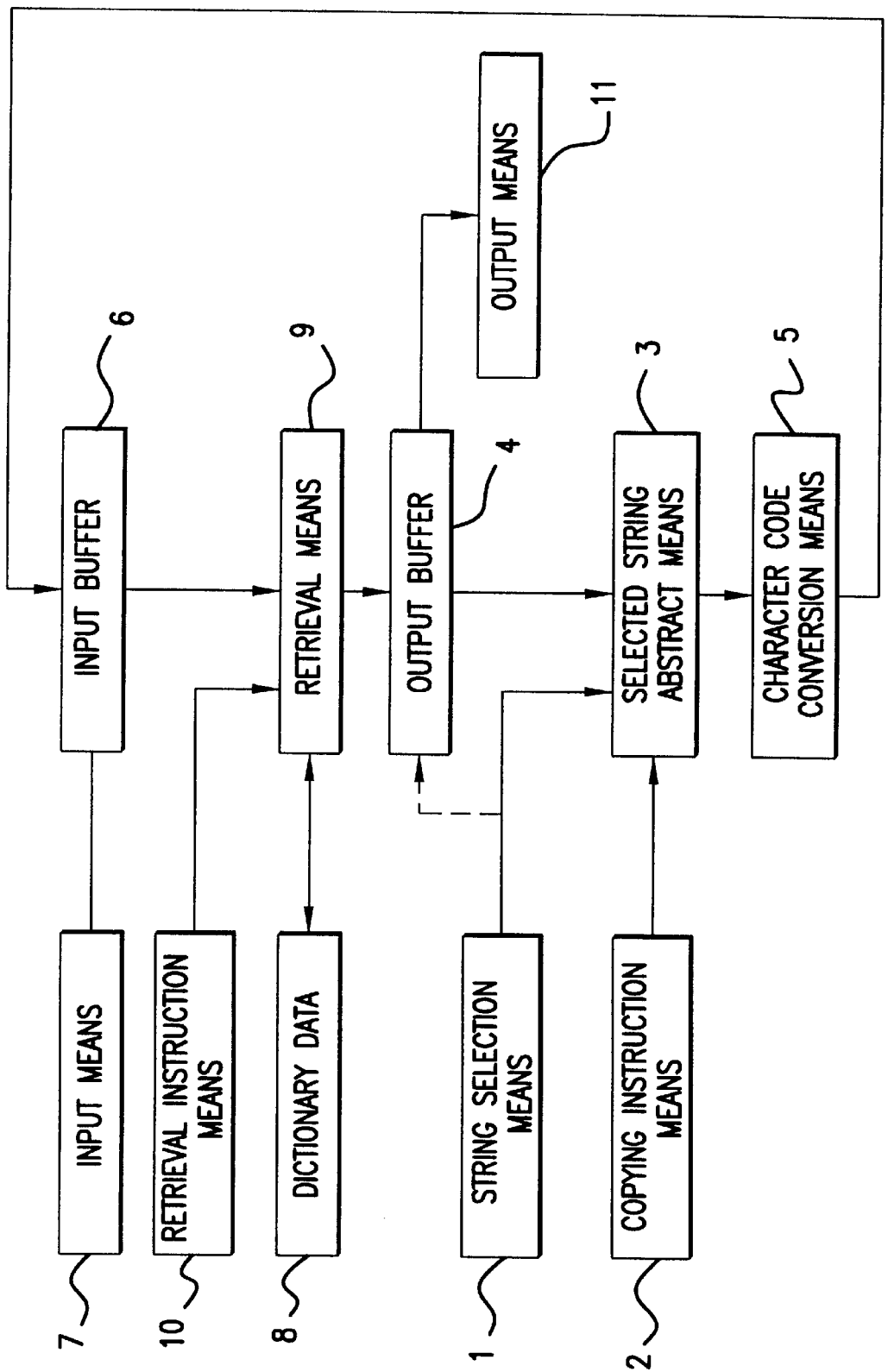
FIG. 2 is a functional block diagram showing an example of construction in the case where the different code string copying apparatus shown in FIG. 1 is applied to an electronic dictionary.

FIG. 2 is a functional block diagram showing a construction example in the case where the different code string copying apparatus according to the present invention shown in FIG. 1 is applied to an electronic dictionary. Components corresponding to components of the block diagram of FIG. 1 have the same reference numbers as those of the block diagram of FIG. 1.

Input means 7 is provided for inputting a string such as a keyword for retrieval by an inputting device, for example, a keyboard. Retrieval means 9 is provided for executing retrieval in dictionary data 8 corresponding to the input string stored in the input buffer 6. Retrieval instruction means 10 is provided for enabling the user to instruct a retrieving operation. Like the copying instruction means 2, the function key on the keyboard, the button on the mouse or the push button on the display can be utilized to activate the retrieval instruction means 10. Like the retrieval instruction means 10, a return key on the keyboard may also be used. Output means 11 is provided for visualizing the contents of the output buffer, for example, a CRT or a liquid crystal display.

Figure 3:
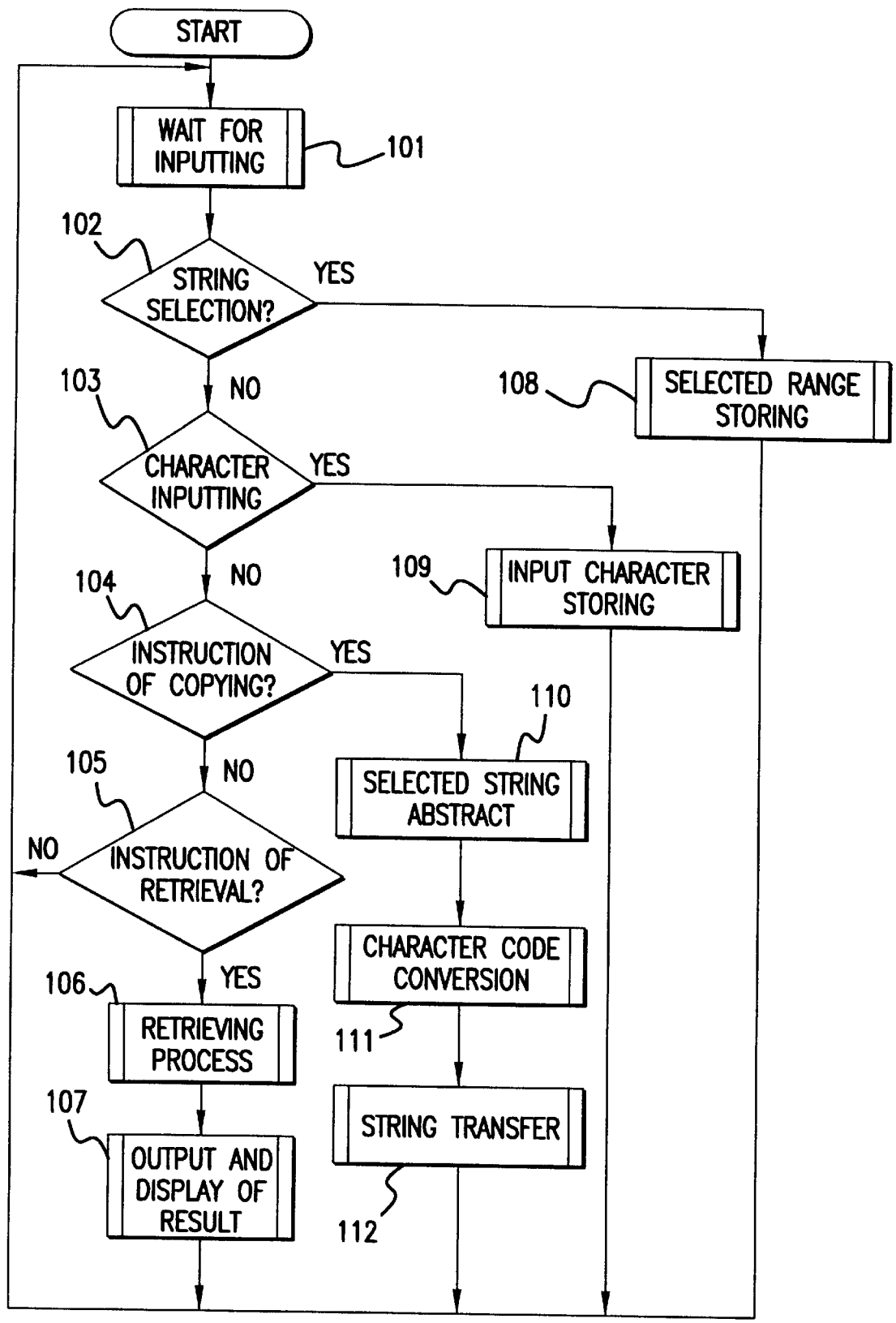
FIG. 3 is a flow chart schematically showing operations in the case where the different code string copying apparatus is applied to the electronic dictionary as shown in FIG. 2.

FIG. 3 is a flow chart schematically showing the case where the different code string copying apparatus according to the present invention is applied to the electronic dictionary as shown in FIG. 2.

First an input from the user is accepted (step 101).

If it is determined that a string is not selected in step 102, the flowchart moves to step 103. If a character is input by the inputting means 7 (i.e., step 103 is "yes"), input characters are stored in an input buffer 6 (step 109).

Figures 4, 5:
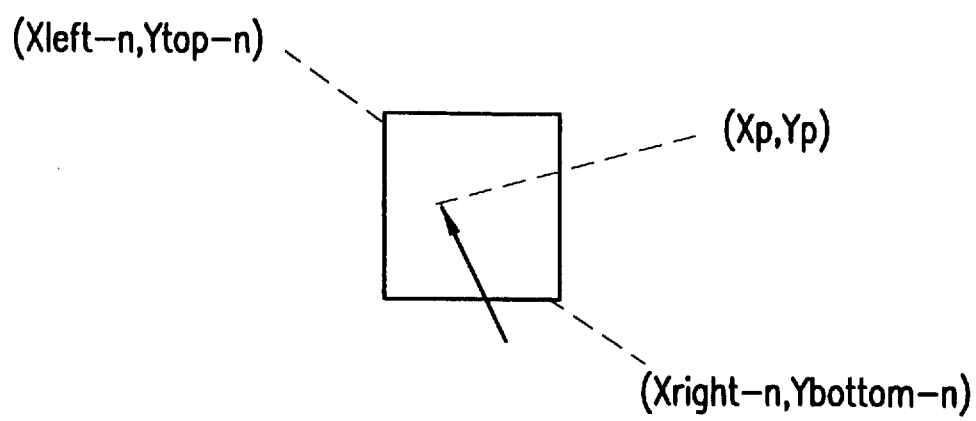
FIG. 4 is an example of input/output in the retrieval of the electronic dictionary in the first embodiment.
FIG. 5 is an example of determination of selection range in the case where a string is selected by a mouse in the first embodiment.

If neither character inputting (step 103) nor copying instructions (step 104) occurs, the flowchart moves to step 105. When retrieval is instructed (step 105), the retrieval means 9 executes retrieval in the dictionary data 8 using the string stored in the input buffer 6 as a keyword (step 106), and the result is stored in the output buffer 4. The result stored in the output buffer 4 is displayed by the output means 11 (step 107). If the input buffer 6 is empty, the apparatus is constructed not to accept the retrieval instruction, or it can be constructed so that an alert is displayed to the effect that the retrieval is impractical because the input buffer is empty. The retrieving process is applicable to any retrieving apparatus as long as it executes the retrieval using a keyword. FIG. 4 is an example of retrieving process of an English-Japanese dictionary, where a result of retrieval for "letter" in the input buffer 6 is shown: てがみ、もじ、ぶんがく、がくもん (equivalents of "letter" represented in Japanese kana script) . . . " is obtained.

When a string is selected by the string selection means 1 (step 102), the range of the selected string is temporarily memorized (step 108). If the output string which is to be the object of selection is not displayed, the apparatus can be constructed not to accept the selecting instruction and input of the string, or it can also be constructed so that an alert is displayed to the effect that the string cannot be selected.

As the range of the selected string, various forms such as the coordinates or a character offset from the starting point can be considered. In this embodiment, it is assumed that the string is selected by designation of the coordinates by the mouse and its range is converted into the character offset from the starting point and then stored.

FIG. 5 is an example of conversion of designated coordinates into character offset from the starting point, wherein a rectangle represented as (Xleft-n, Ytop-n) and (Xright-n, Ybottom-n) indicates allocated coordinates of n-th character, and the coordinates represented as (Xp, Yp) indicates the coordinates designated by a cursor. n indicates the character offset from the starting point of the character designated by a cursor if the following inequalities are available:

Xleft-n≦Xp≦Xright-n and

Ytop-n≦Yp≦Ybottom-n

Figure 6:
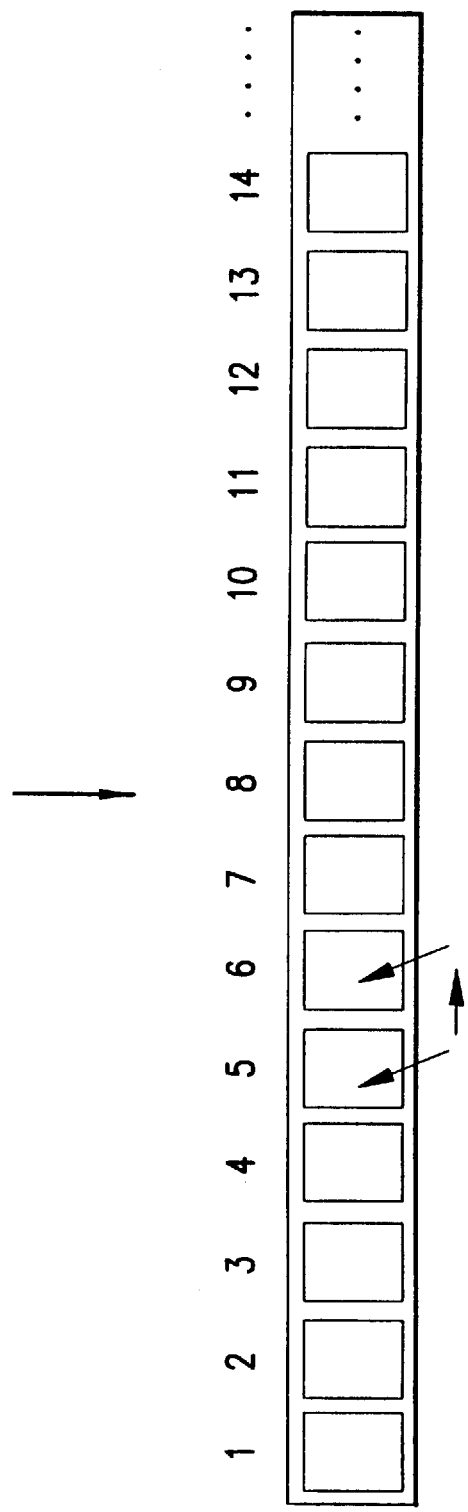
FIG. 6 is an example of selection of a part of the output string shown in FIG. 4 in the first embodiment.

FIG. 6 is an example in which もじ、 is selected in accordance with the start point and end point coordinates designated by the cursor, that is, it is obtained by the method as shown in FIG. 5 that 5th and 6th characters are selected, and is transferred to the selected string abstract means 3. In the selected string abstract means 3, the character offsets of the start point and the end point from the starting point are stored. There are some methods of designating the start point and the end point by a mouse such that the mouse button is pressed at the start point and released at the end point, or that the left button is pressed at the start point and the right button is pressed at the end point if the mouse has at least two buttons, and so on. Instead of designation by the mouse, the start point character offset 5 and the end point character offset 6 may be directly input using a keyboard. In the case of designating the coordinates by the mouse or the like, information about the position of the cursor is also transferred to the output buffer 4 or the output means 11 and the cursor is displayed. In the example of this embodiment, selection is executed for each character unit, but the selection is not only limited to this, but may be carried out for each word unit or the like. For example, the apparatus can be constructed so that the input of numeral 2 designates selection of second word, or that the press of the mouse button designates selection of the range from the character following "," to the next ",". The latter method can be realized with ease by changing the rectangle covering a character unit compared with the coordinates indicated by the cursor into the rectangle that covers the word unit.

In the case of copying instruction (step 104), the selected string abstract means 3 fetches the string based on the range of the selected string which has been stored (step 110), and the character code conversion means 5 converts the fetched string into that of the different code set (step 111), and then transfers the converted character code to the input buffer 6 as a result (step 112). The apparatus can be constructed not to accept the copying instruction if no string is selected, or can be constructed so that an alert is displayed to the effect that copying is impractical because no string is selected.

In the example of FIG. 6, the range of selection of the string is stored in the form such as "The start point is 5th character and the end point is 6th character". FIG. 7 is an example of data in the output buffer 4 in the case where the string which is the object of selection in FIG. 6 is the EUC code, and the character offset indicates an address relative to the starting address. Based on stored start point and end point, the string もじ、 namely, the data A4E2A4B8 in hexadecimal number can be easily obtained.

Next, the character code conversion means 5 converts the string into that of the different code set. It is assumed that 7-bit ASCII code characters are only permitted as a string to be input in the retrieving process in this embodiment. If the data A4E2A4B8 obtained in the example shown in FIG. 7 is transferred to the input buffer, problems occur such that only the lower 7 bits are recognized or that the data is divided into every 7 bits from the highest order, thus making no sense. Moreover, if the transferred input string is set to be displayed, a font which does not correspond to Japanese, for example, necessarily generates the state where characters are represented as different characters or abnormally displayed. Consequently, in this embodiment, the string もじ、 (represented by Japanese kana script)" is converted into an English equivalent and then transferred.

FIG. 9 is an example of a lookup table for converting a Japanese string into an English equivalent, that is, converting a Japanese string into an English word corresponding to a typical meaning of the Japanese. Thereby the string もじ、 is converted into the string "character" and transferred to the input buffer 6 for reusing it as the input string. FIG. 10 is an example in the case where "character" is transferred to the input buffer 6 and the retrieval instruction is again executed. Accordingly, in this embodiment, characters are not represented as different characters or abnormally displayed, and the output can be reused. Furthermore, it is possible to recognize "character" as a synonym of "letter" and to learn its meaning. In this embodiment, the method using the lookup table is shown, but all retrieving processes such as the full text retrieval or the hash table method are available as long as one-to-one correspondence exists between pre-conversion string and postconversion string.

Figure 11:
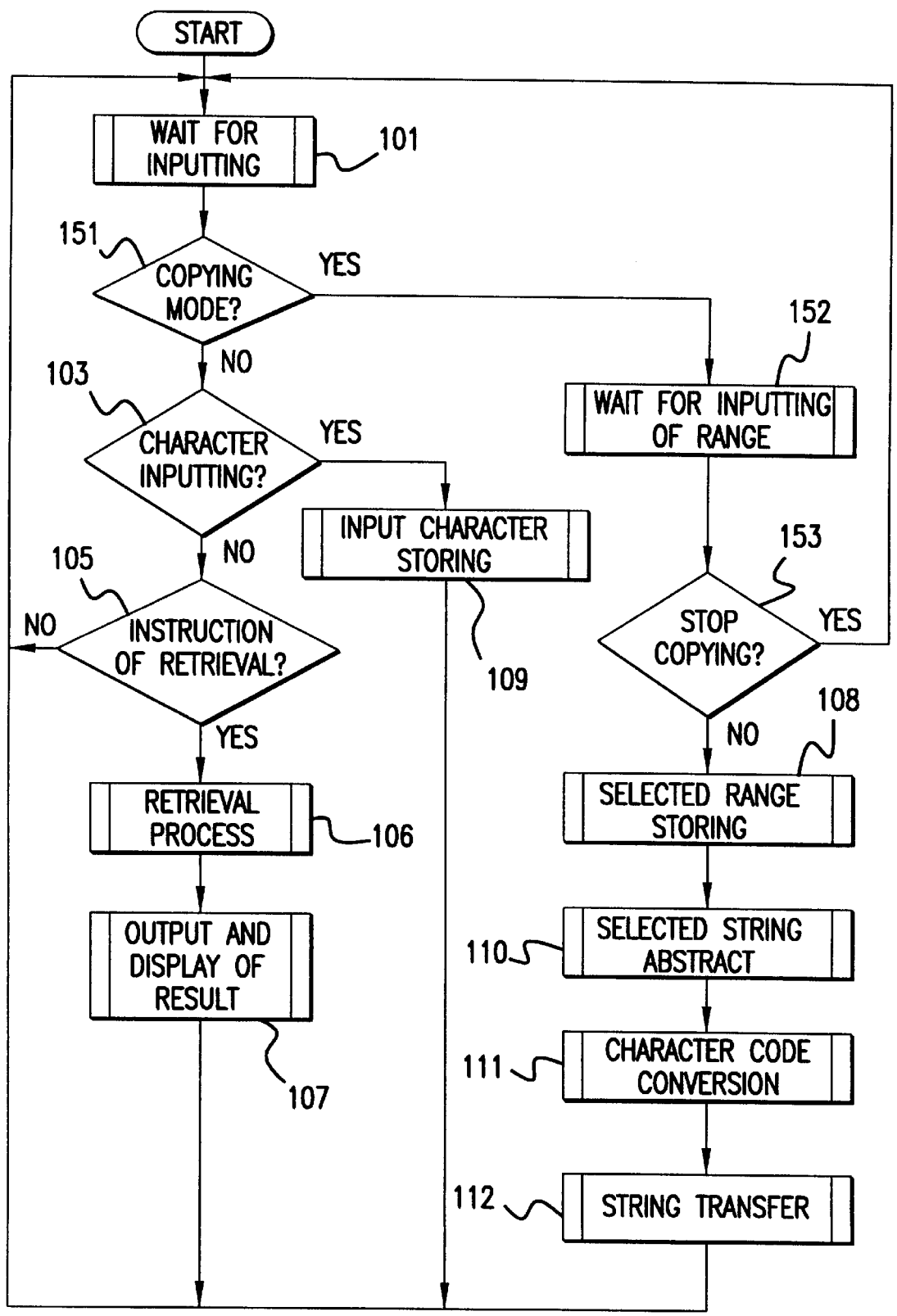
FIG. 11 is a flow chart schematically showing a case where a copy mode is instructed in the electronic dictionary to which the different code string copying apparatus is applied.

FIG. 3 is a schematic flow chart showing the case where the copying operation is executed by the copying instruction means 2. The flow chart illustrating operations in the case where the copying mode is instructed is shown in FIG. 11.

The difference between copying operation instruction and copying mode instruction is as follows, though this will also be explained later in the description of second and third embodiments. In the case of the copying operation, the operation of selection of the string by the user is executed earlier than the copying operation instruction (step 104), and on the other hand, in the case of the copying mode, the operation of selection of the string by the user is executed later than the copying mode instruction and yet the apparatus waits for selection of the string. That is, in the case of the copying operation instruction, the string is selected in step 102 and the copying instruction for the selected string (step 104) is carried out, and in the case of the copying mode instruction, instruction of switching over to the copying mode without selecting the string (step 151 in FIG. 11) is provided and the string selection/input is awaited after switching over to the copying mode (step 152 in FIG. 11).

In the second and third embodiments described below, the method of designating the copying operation can be easily changed to the method of designating the copying mode in the same way as described above. The first embodiment is specially effective in the case where the transferring side application process is represented by a unique code set.

Second Embodiment

Figure 12:
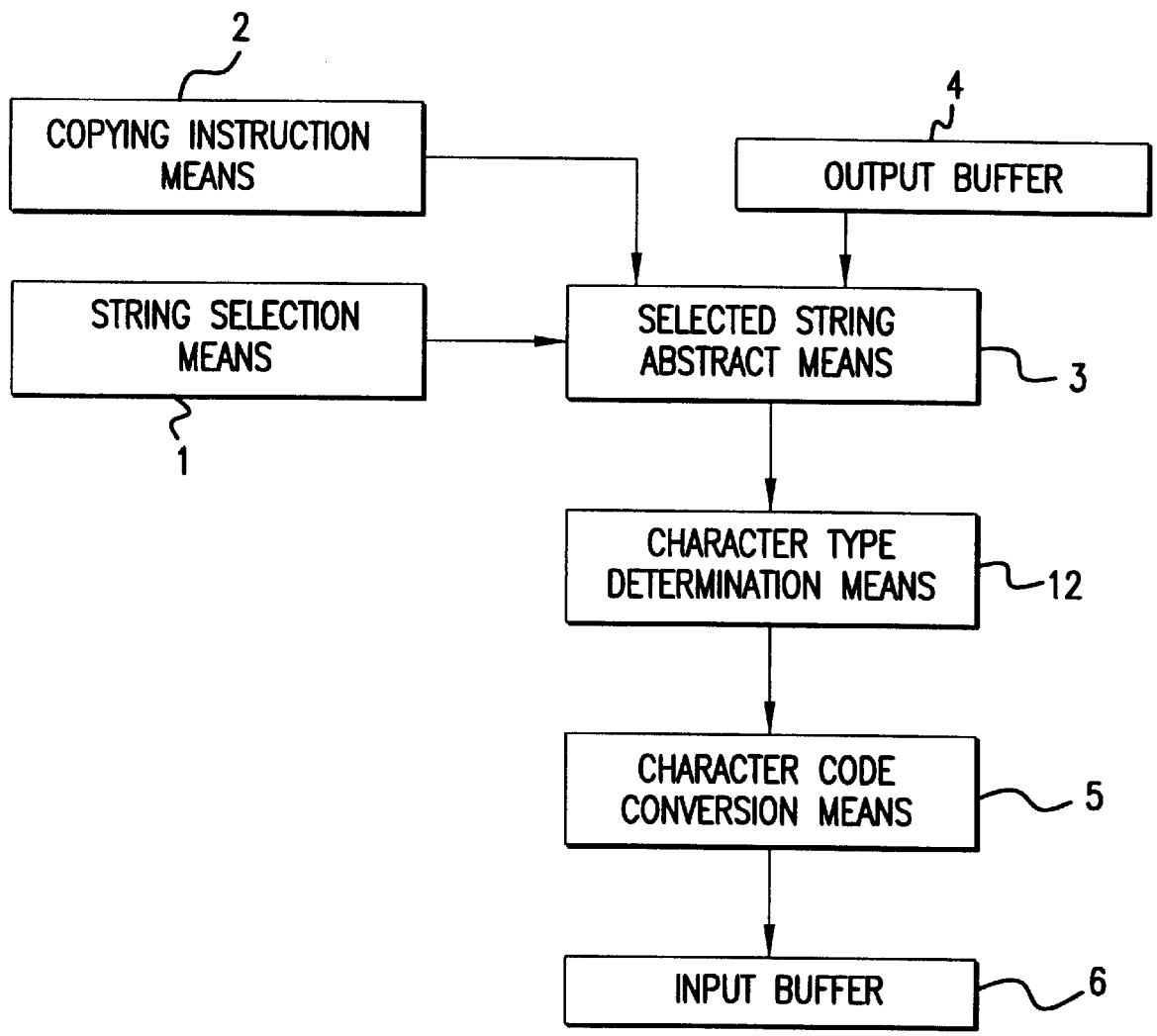
FIG. 12 is a block diagram showing a basic construction of a second embodiment of the different code string copying apparatus according to the present invention.

FIG. 12 is a block diagram showing the basic construction of a second embodiment of the different code string copying apparatus according to the present invention. Components corresponding to components of the first embodiment have the same reference numbers as those of the first embodiment and explanation is omitted.

The block diagram in FIG. 12 is different from the block diagram in FIG. 1 that character type determination means 12 is provided between the selected string abstract means 3 and the character code conversion means 5. The character type determination means 12 is provided for determining the type of each character in the string, for example, Japanese character, ASCII or the like, selected by the string selection means 1. Further, difference in the font number is distinguished. That is, the font number is displayable only in the present application process, for example, the font number 251 in the table in FIG. 26 is distinguished. The possibility of display of the font only in the application process is determined depending on whether the font number is locally held by the application process.

Figure 13:
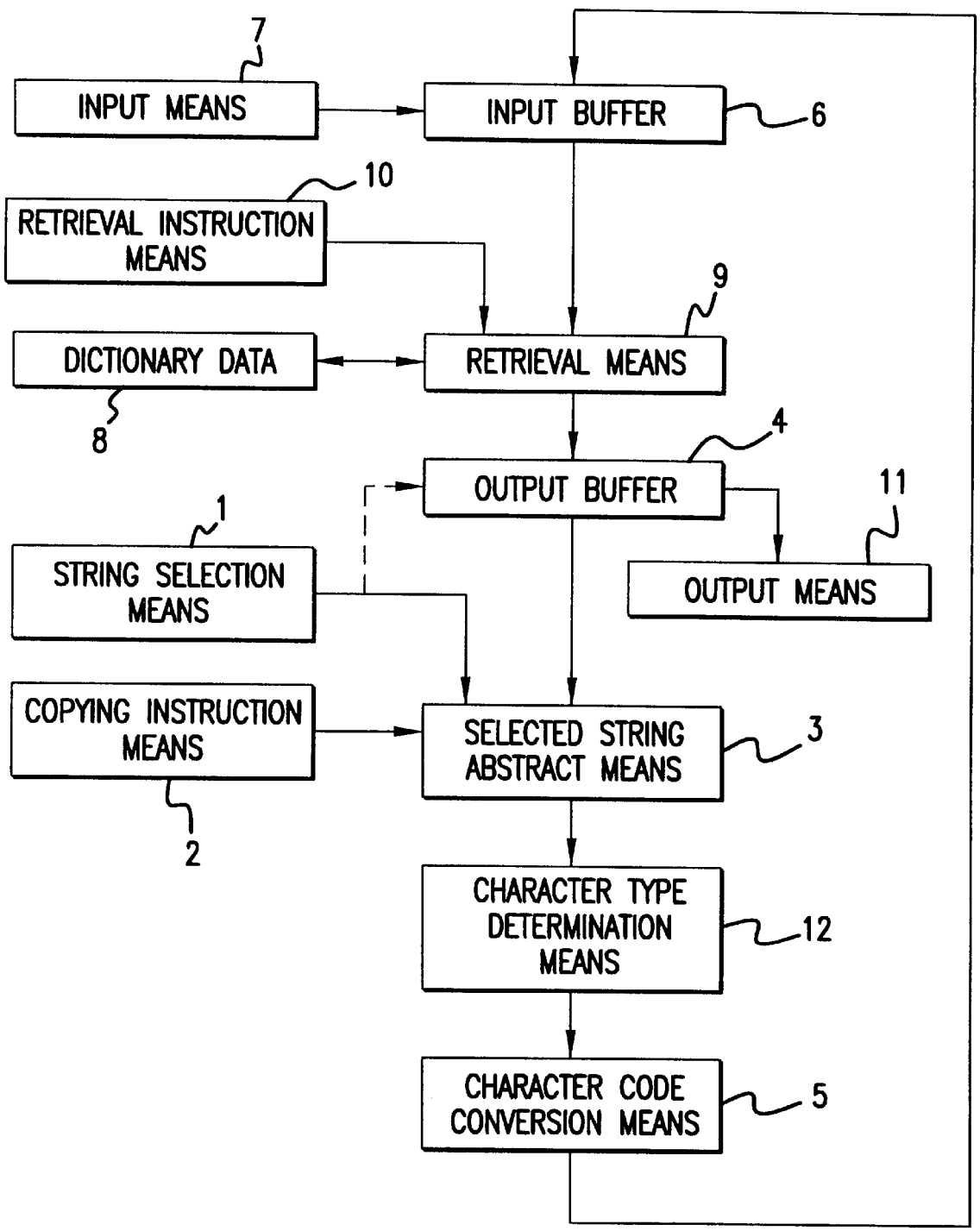
FIG. 13 is a block diagram showing an example of construction in the case where the different code string copying apparatus shown in FIG. 12 is applied to an electronic dictionary.

FIG. 13 shows an example of construction in the case where the different code string copying apparatus shown in FIG. 12 is applied to an electronic dictionary. Constituents corresponding to constituents of the diagrams in FIGS. 12 and 13 have the same reference numbers as those of the diagrams in FIGS. 1 and 2, and explanation is omitted.

Figure 14:
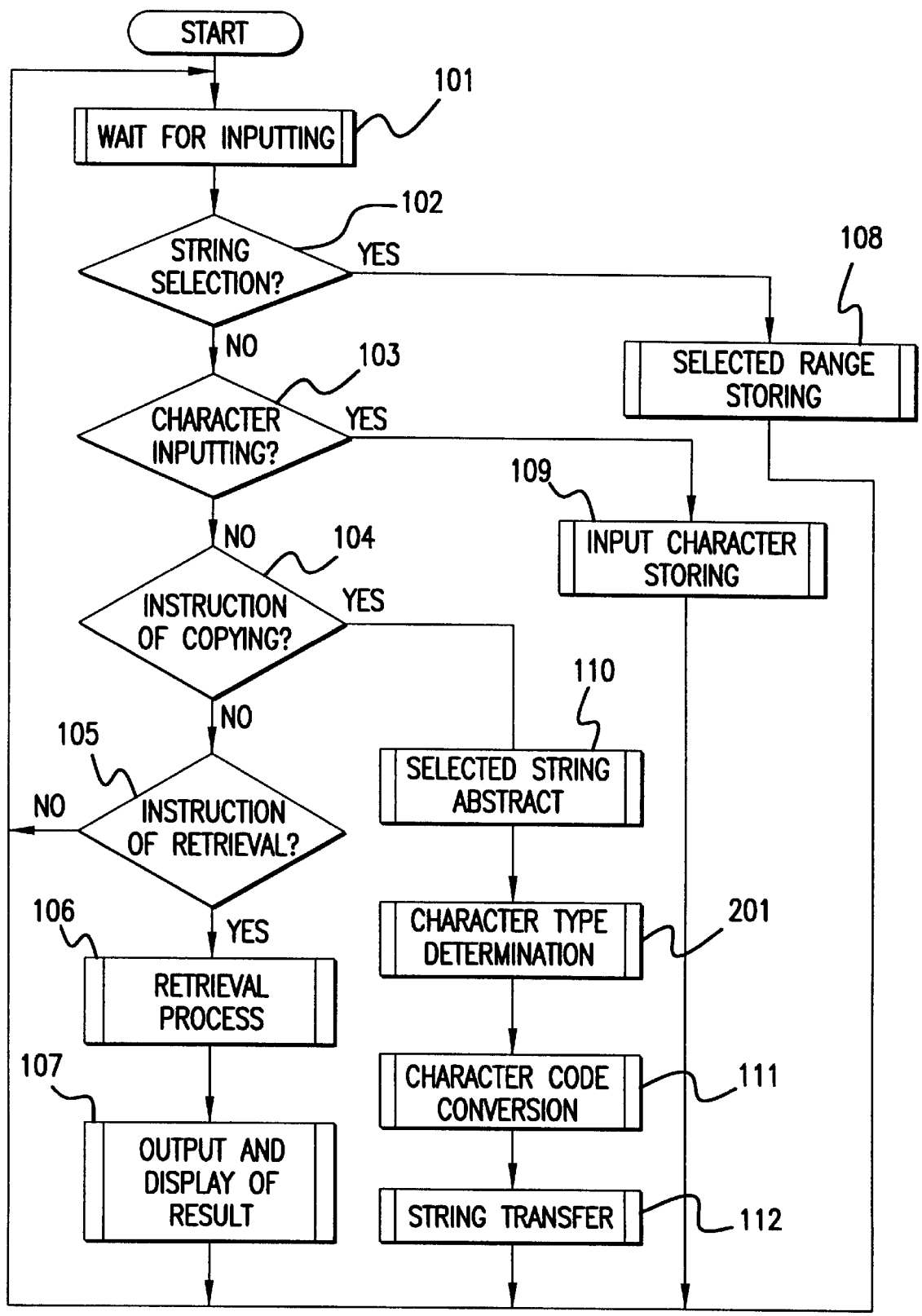
FIG. 14 is a flow chart schematically showing operations in the case where the different code string copying apparatus is applied to the electronic dictionary as shown in FIG. 13.

FIG. 14 is a flow chart schematically showing operations in the case where the different code string copying apparatus is applied to the electronic dictionary as shown in FIG. 13. Constituents corresponding to constituents of the flow chart in FIG. 14 have the same reference numbers as those of the flow chart in FIG. 3.

The flow chart shown in FIG. 14 is different from the flow chart in FIG. 3 in that the process of character type determination (step 201) is inserted between the processes of abstract of the selected string (step 110) and character code conversion (step 111).

Steps of the flow chart in FIG. 14 are now described.

First, the input from the user is accepted (step 101).

In the case of the input of characters by the input means 7 such as a keyboard (step 103), the input characters are stored in the input buffer 6 (step 109).

Figure 15:
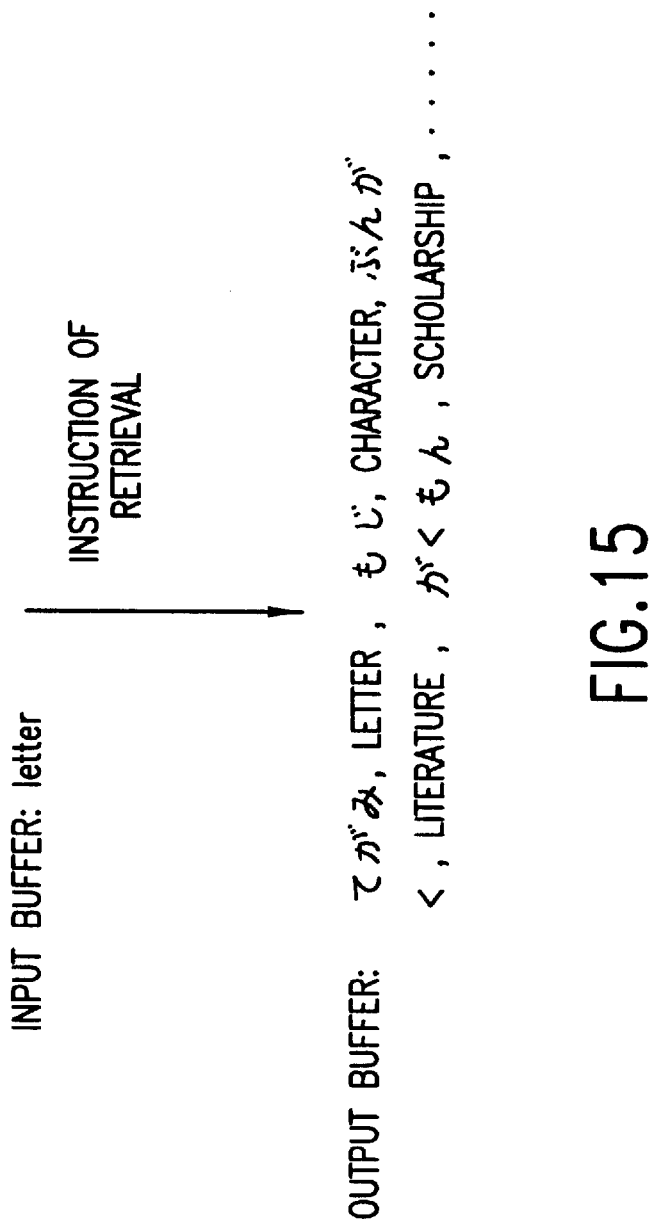
FIG. 15 is an example of input/output in retrieval of the electronic dictionary in the second embodiment.

In the case of retrieval instruction (step 105), like the first embodiment, the retrieving means 9 executes the retrieval in the dictionary data 8 based on the string stored in the input buffer 6 as a keyword (step 106) and stores the result of retrieval in the output buffer 4. The output means 11 displays the result stored in the output buffer 4 (step 107). The process and construction of retrieval instruction are as same as those of the first embodiment. FIG. 15 is an example of retrieving process in an English-Japanese dictionary, wherein it is indicated that the result of retrieval てがみ、letter, もじ、character, ぶんがく literature, がくもん scholarship, . . ." can be obtained for "letter" in the input buffer 6.

In the case of selection of the string by the string selection means 1 (step 102), the range of the selected string is temporarily stored (step 108) as same as the first embodiment. The process and construction of string selection are as same as those of the first embodiment. In this embodiment, it is assumed that 12th and 13th characters, that is, a string もじ, is selected.

In the case of copying instruction (step 104), the selected string abstract means 3 fetches a string based on the stored range of the selected string (step 110), the character type determination means 12 determines whether conversion of the code set is necessary by examining the type of the string (step 201), and if necessary, the character code conversion means 5 converts the string into that of the different code set (step 1 11) and transfers the string to the input buffer (step 112). The process and construction in the case where no string is selected are as same as those of the first embodiment.

FIG. 16 is an example of data in the output buffer 4 in the case where the string which is to be an object of selection is in the EUC code in the example shown in FIG. 15, wherein a character offset indicates an address relative to the starting address. The data in the hexadecimal notation corresponding to the string もじ, is A4E2A4B8.

Next, the character type determination means 12 examines the type of the string. In an electronic dictionary in this embodiment, also, the case in which only the 7-bit ASCII code character is permitted as the input string for the retrieving process is explained. In the selected string in the output buffer shown in FIG. 15, it is unnecessary to convert English words, such as "letter" or "character". In the case of the EUC code, distinction between the ASCII character and the Japanese character is easily carried out by watching whether the most significant bit of each code is 1 or not. In the case of the Shift JIS code, the code which begins with a value ranging from 81 to 9F or a value ranging from EO to FC in the hexadecimal number is determined to be the Japanese characters. The determination of the character type may be carried out by utilizing attributes other than the value itself, for example, the type or size of the font.

Figures 17, 18:
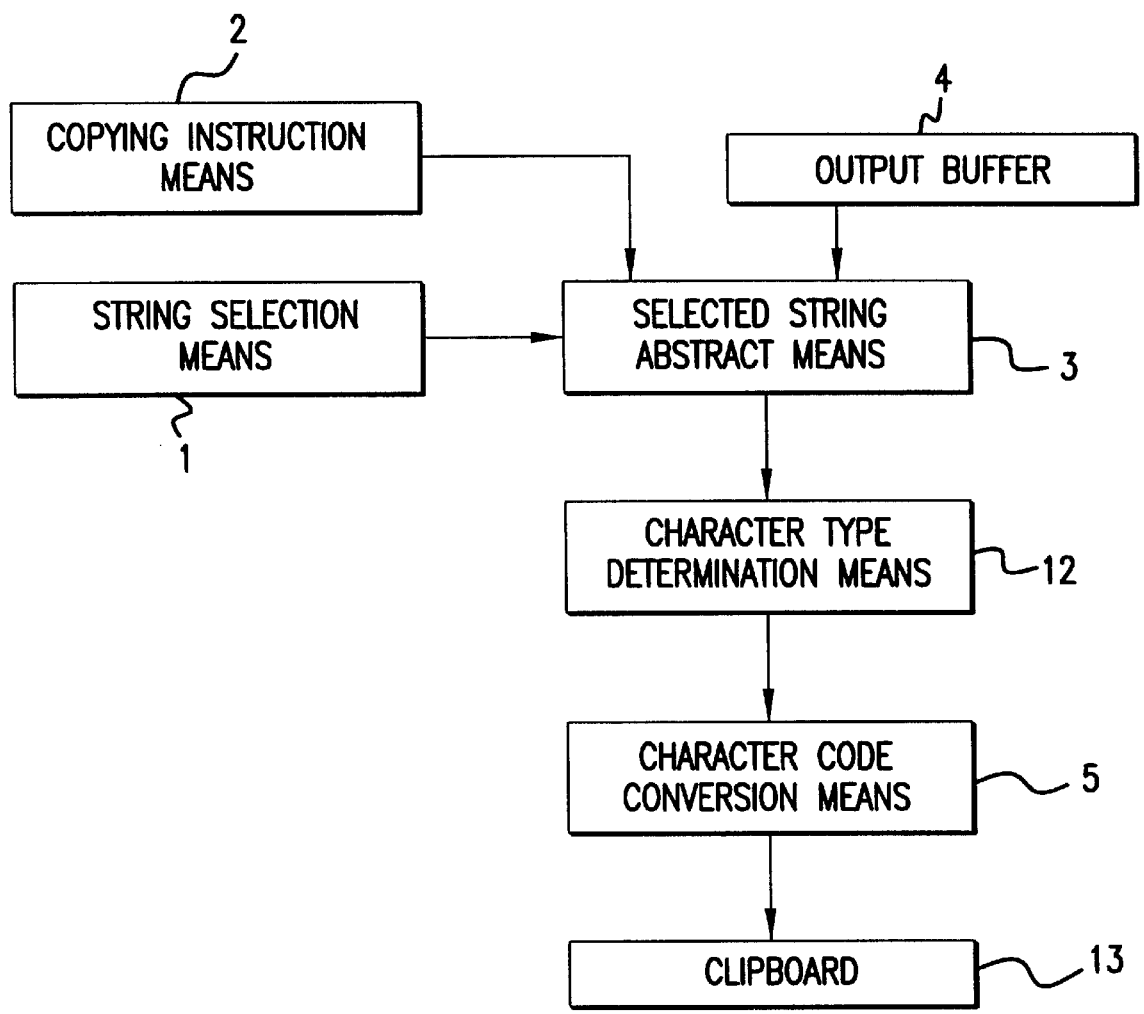
FIG. 17 is an example of output from character type determination means in the second embodiment.
FIG. 18 is a block diagram showing a basic construction of a third embodiment of the different code string copying apparatus according to the present invention.

The determination result is transferred as a conversion request flag with the string to the character code conversion means 5. The conversion request flag has various implementations such as the word unit or character unit, and this embodiment is explained with an example in which the conversion request flag is set for each word unit. FIG. 17 is an output example of the character type determination means 12 including the conversion request flag, wherein it is indicated that the conversion flag is on (1), the size of the string is 4 bytes, and the contents of the string is A4E2A4B8, namely, もじ,.

Next, the character code conversion means 5 transfers the string to the input buffer 6 without conversion in the case where the conversion request flag is off (0). If the conversion request flag is on, the character code conversion means 5 executes the processes as same as the first embodiment and converts the string into that of the different code set. As a result, the stringy もじ, is converted into the string "character" and transferred to the input buffer 6 to be reused as the input string. Moreover, the user is able to know that "character" is a synonym of "letter" and what it means.

Though this embodiment is explained taking the electronic dictionary as the example, it can be applied to the case of re-input of a once fixed string to a Japanese front end processor, because, in the example of the Japanese front end processor, it is required to input entirely with Roman character notation, for example "moji", if Roman character-kana character conversion input method is preset, or it is necessary to convert katakana, one of the two kinds of kana script used for Japanese syllabary writing with square characters into hiragana, the other kana script with cursive characters for inputting if kana input method is preset.

Third Embodiment

FIG. 18 is a block diagram showing the basic construction of a third embodiment of the different code string copying apparatus according to the present invention. Components corresponding to components of the second embodiment have the same reference numbers as those of the second embodiment and the redundant explanation is omitted.

The block diagram in FIG. 18 is different from that in FIG. 12 in that the converted string transferred from the character code conversion means 5 is output to a clipboard 13.

Figure 19:
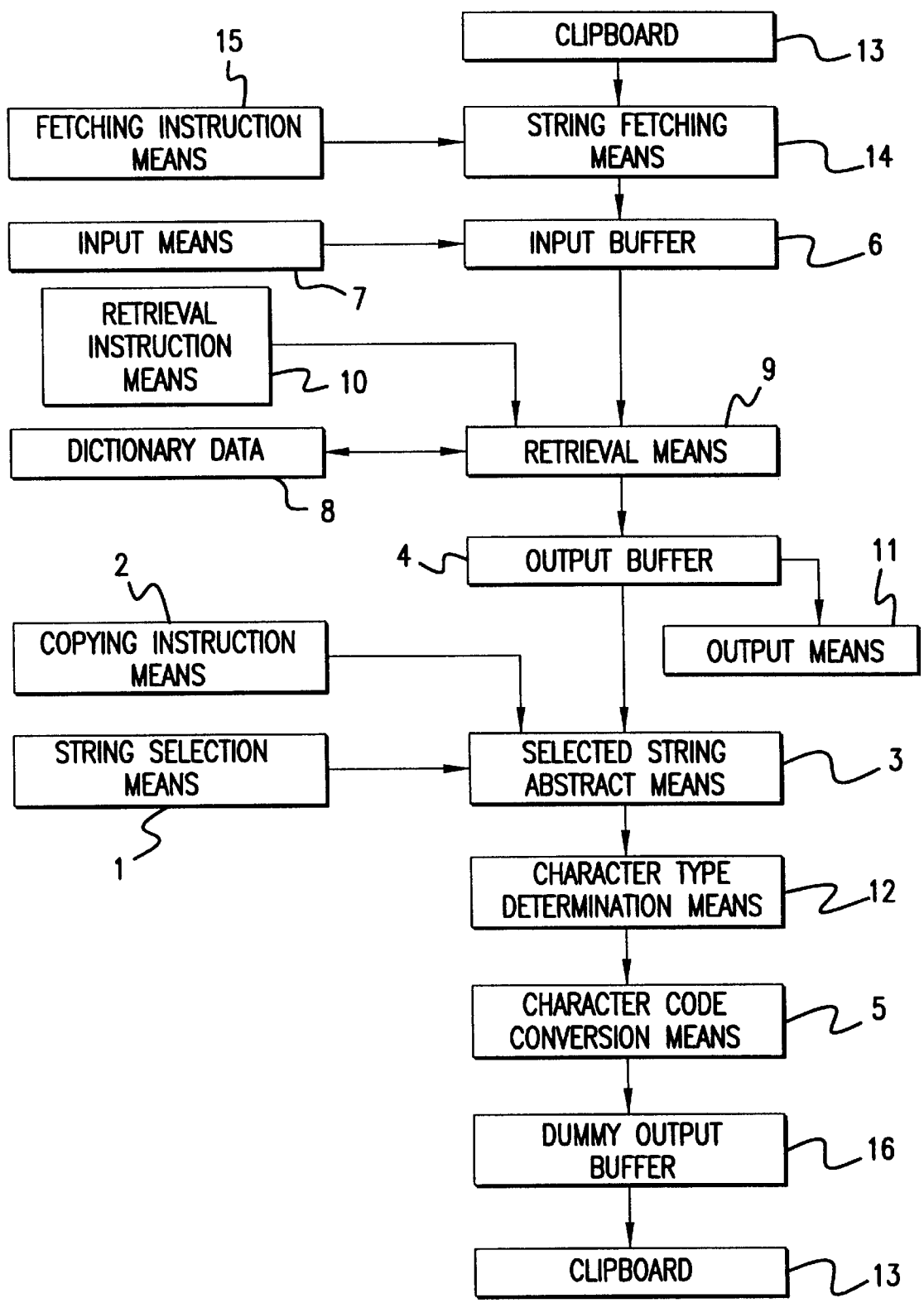
FIG. 19 is a block diagram showing an example of construction in a case where the different code string copying apparatus is applied to the electronic dictionary.

FIG. 19 is an example of construction in the case where the different code string copying apparatus shown in FIG. 18 is applied to the electronic dictionary. Components corresponding to components of the second embodiment have the same reference numbers as those of the second embodiment and explanation is omitted.

The block diagram in FIG. 19 is different from the block diagram in FIG. 13 in that the clipboard 13 is used, string fetching means 14 is provided between the clipboard 13 and the input buffer 6, and fetching instruction means 15 is provided to the string fetching means 14. Also, that the converted string transferred from the character code conversion means 5 is output to the clipboard 13 through a dummy output buffer 16.

The fetching instruction means 15 is provided for enabling the user to instruct operation of fetching the string from the clipboard 13. For activation, the function key on the keyboard, the mouse button, or the push button on the display can be utilized like the copying instruction means 2.

The string fetching means 14 is means for fetching the string from the clipboard 13 and storing the fetched string in the input buffer 6.

The dummy output buffer 16 has the same construction as the output buffer 4 for fetching the converted string to the clipboard 13 in the system having the function for fetching the string from the output buffer 4 to the clipboard 13. If it is possible to write the string in the clipboard 13 directly, the dummy output buffer 16 is unnecessary.

The retrieving means 9 is provided for retrieving data from the dictionary data 8 corresponding to the input string stored in the input buffer 6. In this embodiment, an electronic dictionary capable of executing retrieval using any of Japanese, foreign language and katakana notation of pronunciation which can be realized by utilizing an invention disclosed in the Japanese Patent Application Unexamined Publication No. Hei. 4-10059 (1992) is taken as an example.

Figure 20:
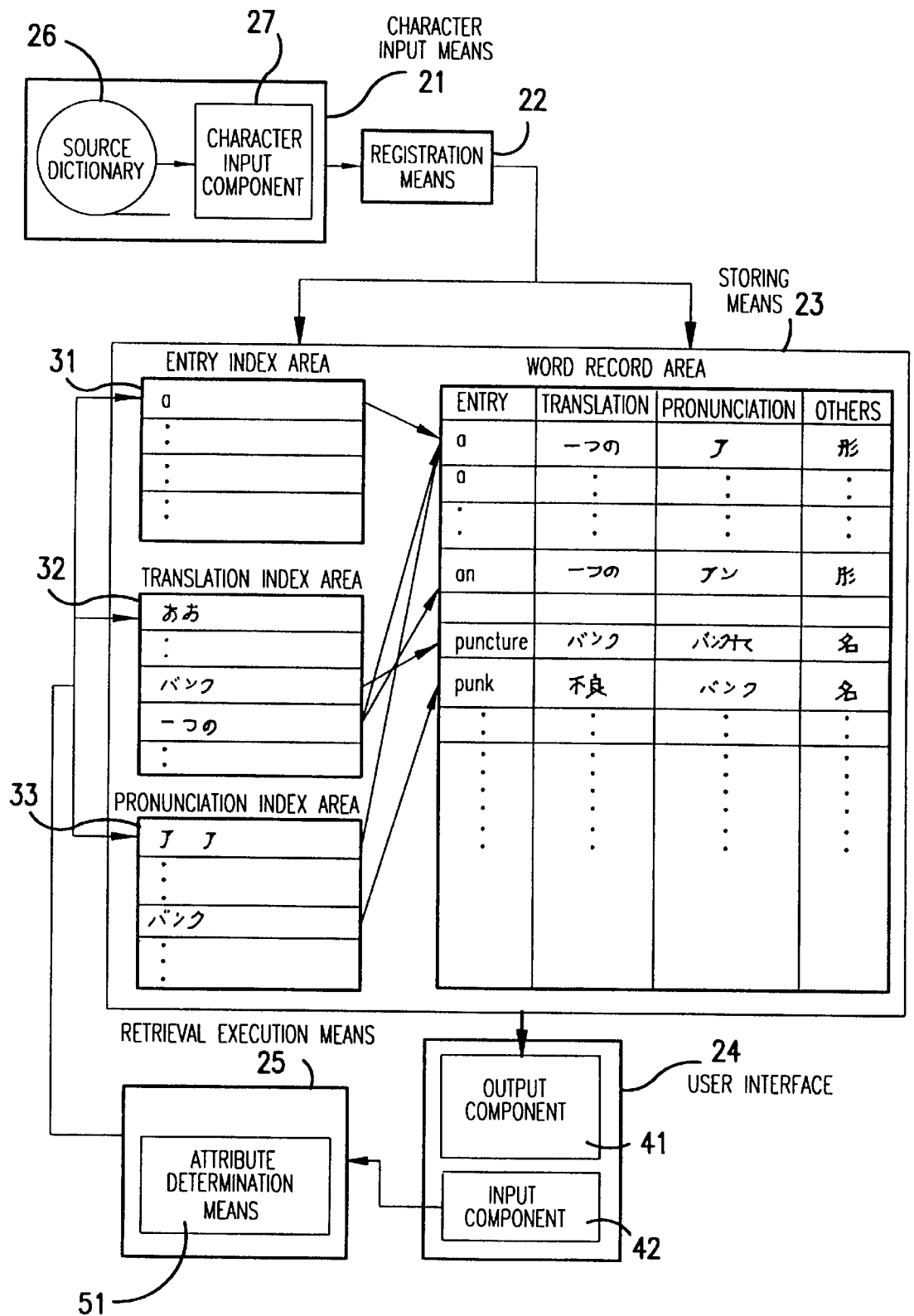
FIG. 20 is a block diagram showing a construction example of an English-Japanese dictionary employing the different code string copying apparatus of the present invention.

FIG. 20 is a block diagram of an electronic dictionary used in this embodiment having the same construction as the electronic dictionary disclosed in the Japanese Patent Application Unexamined Publication No. Hei. 4-10059 (1992).

FIG. 20 shows character input means 21, registration means 22, storing means 23, a user interface 24 and retrieval execution means 25. The storing means 23, the retrieval executing means 25, an input component 42 and an output component 41 in FIG. 20 correspond to the dictionary data 8, the retrieving means 9, the input means 7 and the output means 11 in FIG. 19, respectively. Blocks corresponding to the character input means 21, the source dictionary 26 and the registration means 22 are not shown in FIG. 19.

The character input means 21 comprises the source dictionary 26, which is constructed by converting a paper English/Japanese dictionary into a format which can be processed by computers and storing it in a computer reading medium such as a magnetic tape and the character input component 27. The character input means 21 reads the contents of the English-Japanese dictionary stored in the source dictionary 26 and provides them to the registration means 22.

The registration means 22 sets an English word as a dictionary entry word provided by the character input means 21, its Japanese translation as an attribute and katakana notation of pronunciation as registration items, and stores them with a part of speech as other item in the storing means 23.

The storing means 23 has an entry index area 31, a translation index area 32, a pronunciation index area 33 and a word record area 34. The English-Japanese dictionary database is constructed by storing the entry word, the Japanese translation and katakana notation of pronunciation set by the registration means 22 in the above-described areas 31, 32 and 33, and by storing each of these items in the word record area 34 as the word record.

For example, an entry word "a", the Japanese translation of the word 一つの and its katakana notation of pronunciation ア are registered in the entry word index area 31, the translation index area 32 and the pronunciation area 33, respectively, and at the same time, 一つの and ア are registered in the entry word area, the Japanese translation area and the pronunciation area in the word record area 34, respectively. Moreover 映像, indicating adjectives, the part of speech of the word are registered in another area.

If the same item is registered at least in two of the entry word index areas, e.g., the translation index area and the pronunciation index area, one word record is registered in the storing means 23 corresponding to one word, and therefore waste of storing capacity can be avoided. In the figure, "a" in the entry word index area 31, 一つの in the translation index area 32 and ア in the pronunciation index area 33 all correspond to the record "a" in the word record 34.

Moreover, an item registered in an index area (this item will be regarded as the retrieval key described later) is able to correspond to a plurality of records; accordingly, it is possible to execute similar expression retrieval in which the word records "a" and "an" can be retrieved using the attribute of the item of the translation index 一つの.

Thus the electronic dictionary database can be constructed by parsing, the contents of the source dictionary 26 to a plurality of attributes and setting them, and storing them in the storing means 23.

The user interface 24 comprises the output component 41 and the input component 42. The retrieval key is input by the keyboard or mouse as the input component 42 and the result of retrieval is transferred to the output buffer ordinarily provided for the output component 41 to be output on a view as an output device.

The retrieval execution means 25 retrieves the database stored in the storing means 23 in accordance with the retrieval key input by the input component 42 of the user interface 24 and outputs the result to the output component 41. In advance of execution of retrieval, an attribute determination component 51 provided for the retrieval execution means 25 determines the attribute of input retrieval key, and the word record 34 is retrieved in any of the entry index area 31, translation index area 32 and the pronunciation index area 33 in the storing means 23 in accordance with the determined attribute.

In other words, even if the user inputs the attribute of any of the English entry word, the Japanese translation and the katakana notation of pronunciation, the attribute determination component 51 of the retrieval execution means 25 automatically examines the input attribute and determines the retrieval execution attribute. Consequently, the user can input a notation occurring to him/her related to the word, to be retrieved regardless of its attribute.

So far the retrieval has been separately executed by purpose: an English word is used as a keyword in the case of understanding English sentences, a Japanese word is used in the case, of English composition, and katakana notation of pronunciation is used during training of hearing English. According to the present invention, free use of the electronic dictionary is completely available independently of purposes, that is, operability of the electronic dictionary is greatly improved.

Figure 21:
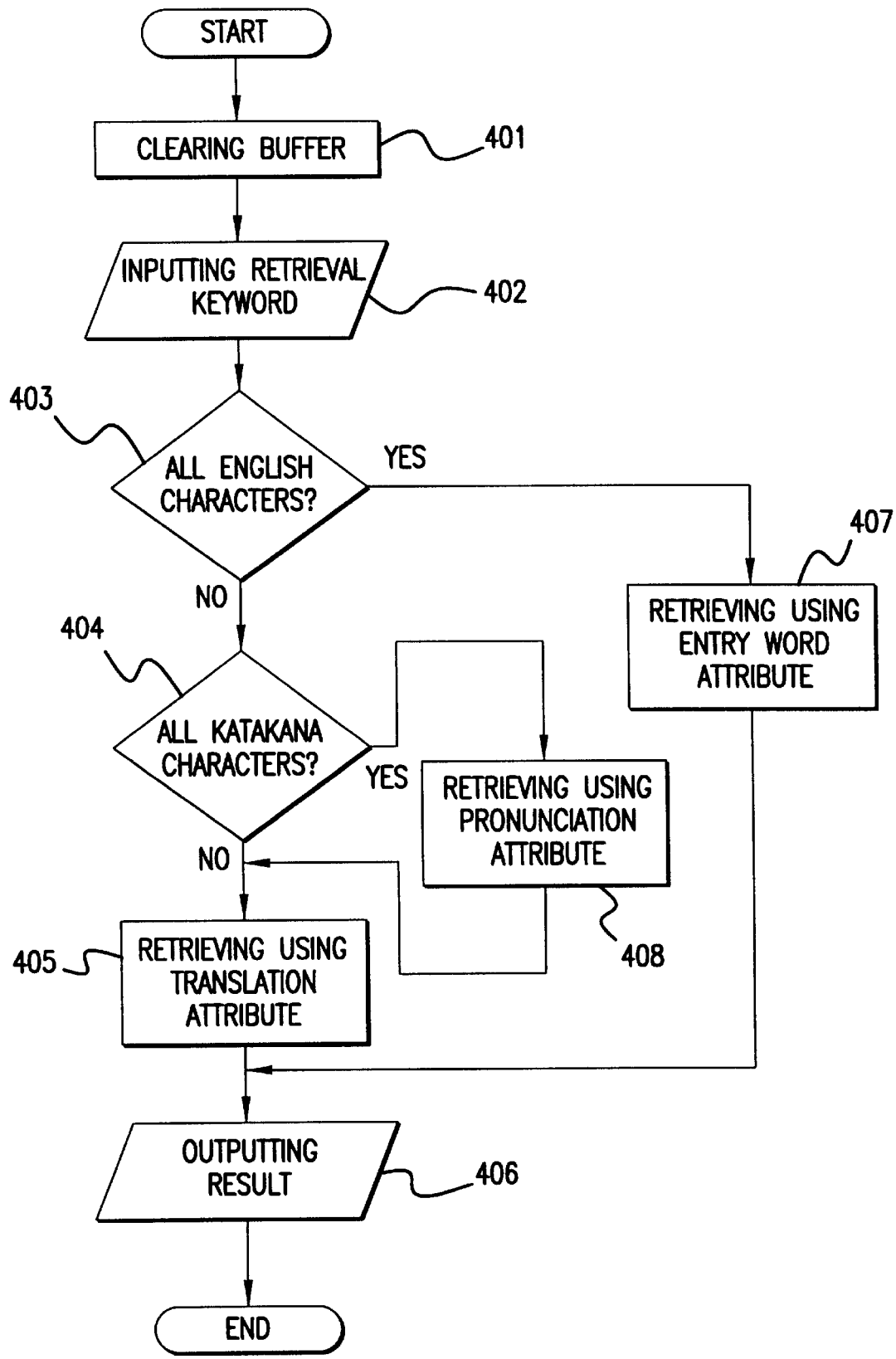
FIG. 21 is a flow chart illustrating an algorithm of a retrieval execution component shown in FIG. 20.

FIG. 21 is a flow chart illustrating an algorithm of retrieving operation in the retrieval execution means 25 shown in FIG. 20. Now the determination of attribute to be retrieved and the flow of the retrieving process in accordance with the determination are described referring thereto.

In FIG. 21, after starting the retrieving process, a preprocess is executed so that the output buffer of the output component 41 is cleared (step 401). When the user inputs the retrieval keyword (step 402), whether the types of characters of input retrieval keyword are all English characters or symbols is determined (step 403). If the determination result is yes, the input retrieval keyword is determined to be the entry word and the retrieval is executed using the attribute of the entry word (step 407), and the result is output to the output buffer. For example, in the case where the input retrieval keyword is a hyphenated compound word such as "all-knowing", the word consists of English characters and a symbol (hyphen, "-"), This retrieval keyword is determined to be the entry word as described above, and the retrieval execution means 25 in FIG. 20 retrieves data from the word record 34 using the entry word stored in the entry word index area 31 in the storing means 23. The result of retrieval transferred to the output buffer is displayed on the view of the output component 41 of the user interface 24 (step 406) to be presented to the user.

If all characters of the input retrieval keyword are non-English characters, numerals and symbols, it is determined first whether all the characters are katakana or not (step 404). In the case where all the characters are katakana, the retrieval keyword is determined to be an attribute of pronunciation notation, and the data is retrieved from the word record 34 using the attribute of pronunciation stored in the pronunciation index area 33 in the storing means 23 (step 408). The result of retrieval using the attribute of the pronunciation notation is transferred to the output buffer, and then the retrieval using the translation attribute stored in the translation index area 32 is executed (step 405) and the result of retrieval is transferred to the output buffer.

As described above, if the character type of the input retrieval key is katakana, the retrieval is executed using the attribute of the katakana notation of pronunciation and the translation attribute. This is because the oversight should be avoided in the retrieval of translation words in the case where the Japanese translation of the word to be retrieved is represented by katakana notation, such as a loan word, for example, a name of an animal or plant. For example, if the user wants to carry out retrieval using a word represented as 映像 in a text but he/she know neither the meaning of the word nor spelling in English, it is merely required to input 映像 regardless of attributes of the word, and the retrieval is automatically started using attributes of the pronunciation and Japanese translation.

Figure 22:
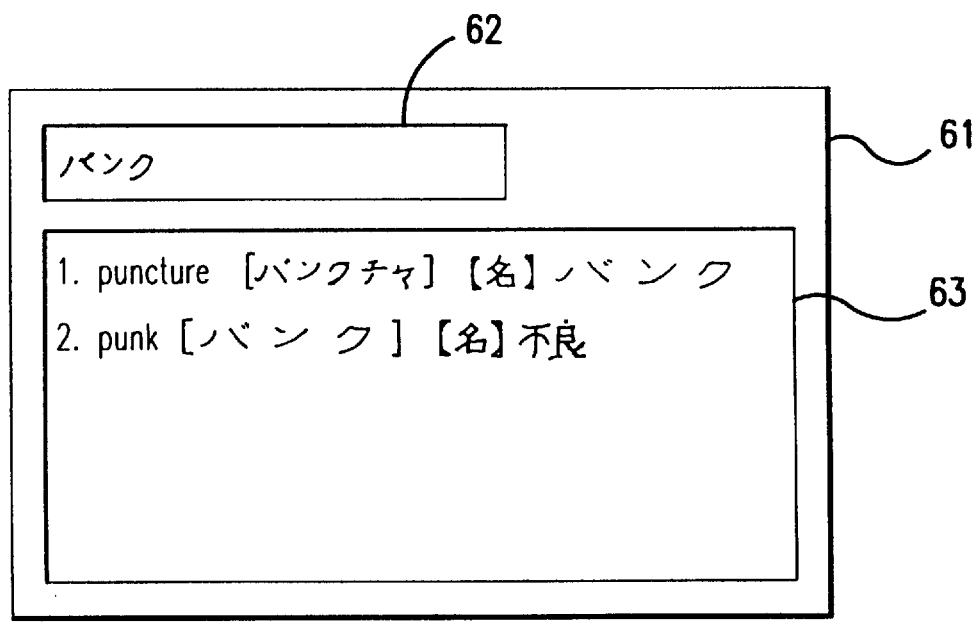
FIG. 22 illustrates a display showing the result of retrieval.

FIG. 22 is a view illustrating the output display representing the result of retrieval described above, wherein "puncture" and "punk" are displayed in the retrieval result displaying component 63 with items of each attribute (katakana notation, translation and part of speech) as the result of retrieval corresponding to the retrieval key 映像 displayed on the retrieval key displaying component 62 of the display 61.

Figure 23:
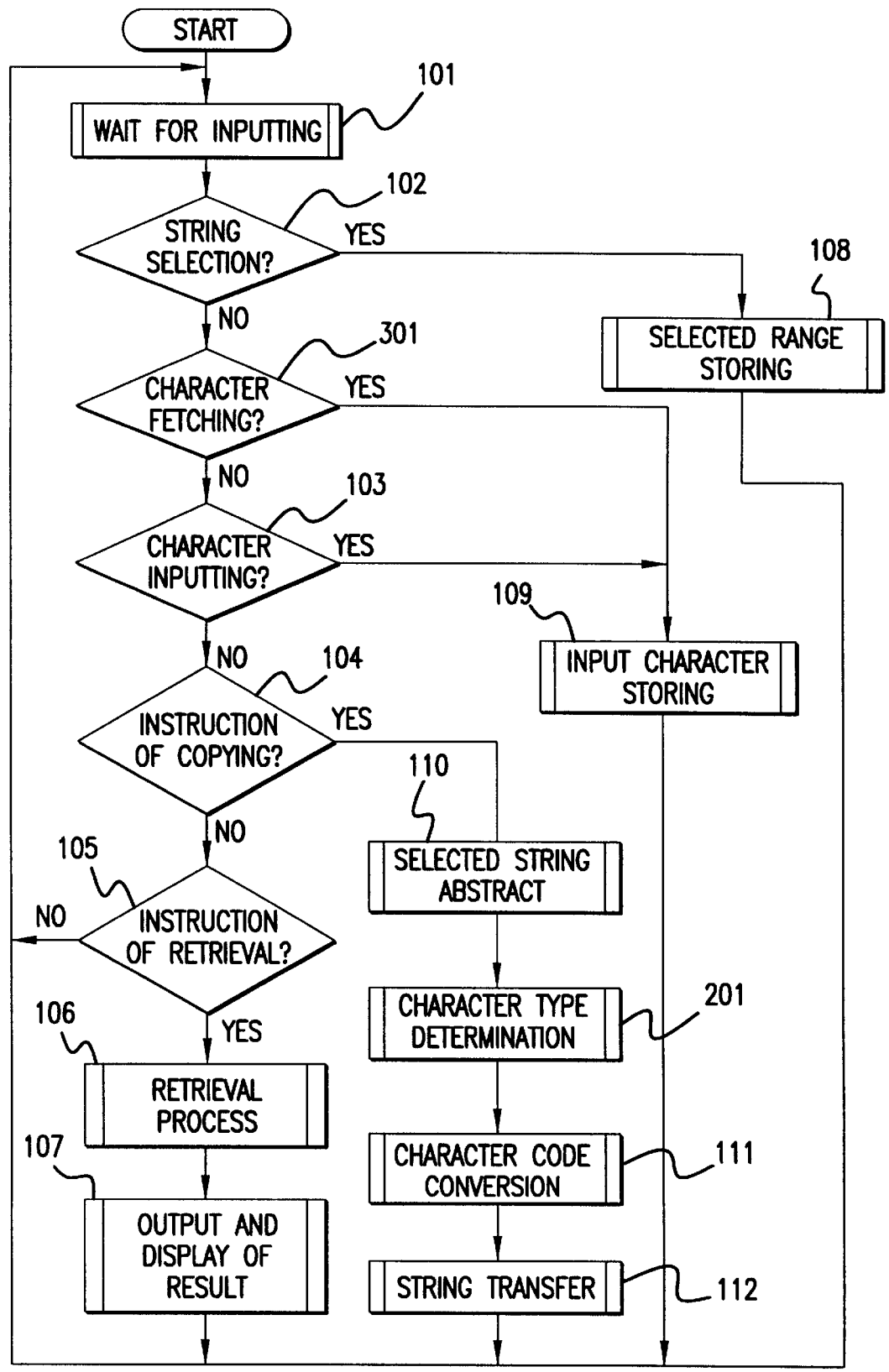
FIG. 23 is a flow chart schematically showing operations of the electronic dictionary shown in FIG. 19.

FIG. 23 is a flow chart schematically showing the operation of the electronic dictionary shown in FIG. 19. Steps corresponding to steps of the flow chart in FIG. 14 have the same reference numbers as those of the flow chart in FIG. 14 and the explanation is omitted.

The flow chart shown in FIG. 23 is different from the flow chart in FIG. 14 in that a step 301 of character fetching determination is inserted between the step 102 of string selection determination and the step 103 of character input determination 103, and in the case of character fetching, the process proceeds to step 109 of input character storing.

First, the input from the user is accepted (step 101). In the case of character inputting by the input means 7 such as a keyboard (step 103) the input character is stored in the input buffer 6 (step 109). In the case of character fetching from the clipboard 13 (step 301), the fetched string is directly stored in the input buffer 6 (step 109).

In the case of retrieval instruction (step 105), like the first and second embodiments, the retrieving means 9 executes retrieval of data from the dictionary data 8 using the string stored in the input buffer 6 as the keyword, and stores the result of retrieval in the output buffer 4. The result stored in the output buffer 4 is displayed by the output means 11. The process and construction shown in FIGS. 20 and 21 can be employed as the process and construction shown in the flow chart in FIG. 23.

FIG. 24 is an example of a retrieving process in the electronic dictionary, wherein the result of retrieval for "letter" in the input buffer is indicated.

In the case of selecting the string by the string selection means 1 (step 102), the range of the selected string is temporarily stored (step 108) as same as the first and second embodiments. The process and construction for the string selection are as same as those of the first and second embodiments. In this embodiment, it is assumed that the string is selected with a range from 11th character to 14th character. FIG. 25 shows an example in which the string has been selected.

In the case of copying instruction (step 104), like the first and second embodiments, the selected string abstract means 3 fetches the string based on the range of the selected string which has been stored (step 110), and the character type determination means 12 examines the type of string (step 201) to determine whether the conversion of the code set is necessary or not. If the code set conversion is necessary, the character code conversion means 5 converts the string into that of the different code set (step 111) and transfers the converted string to the dummy output buffer 16 (step 112).

FIG. 26 is an example of data in the output buffer 4 in the case where the string to be the object of selection consists of phonetic symbols in the example of FIG. 25, and the character offset indicates the address relative to the starting address. Here, the normal font number is 1 and the font number for the phonetic symbol is 251. In FIG. 26, the string ranging from the 11th character to the 14th character originally consists of phonetic symbols employing a special code set, and therefore it is represented as "1DtW" in the normal code set, which makes no sense.

Next, the character type determination means 12 examines the type of the string. In the electronic dictionary of the present embodiment, whether the string is converted or not is determined depending on the type of the font. This embodiment may be constructed so that the character code conversion means 5 executes the conversion if the font number is 251. Like the second embodiment, the conversion request flag can be provided instead of the font number, wherein the words with the font number 251 are set to 1, and the other words are set to 0. In the example of FIG. 26, the data "006C, 251, 0044, 251, 0074, 251, 0057, 251", which are pairs of the code value and the font number, is transferred to the character code conversion means 5.

Then the character code conversion means 5 executes the process. If the font number is other than 251, the string is transferred to the dummy output buffer 16 without conversion of the character code. If the font number is 251, the string is converted to that of the different character code and transferred to the dummy output buffer 16. In this embodiment, the string of phonetic symbols is converted into the string of katakana notation of pronunciation. The conversion of string of phonetic symbols into that of the katakana notation can be easily realized by the method shown in FIGS. 28 to 34, which will be described later. As a result, the string which is necessarily represented as "1DtW" in the normal code set is converted into the stringy レタ and transferred to the dummy output buffer 16. It is further transferred from the dummy output buffer 16 to the clipboard 13 where it can be reused as the input string. FIG. 27 is an example in which the whole result of retrieval is transferred to the clipboard, and further transferred to the other apparatus.

Thus, according to the third embodiment, undesirable change or abnormal display of character can be prevented and the output can be reused, and moreover, the user is capable of learning how to pronounce the phonetic symbols. Furthermore, it is possible to transfer the string to another machine which has no fonts for the font number 251 without undesirable change or abnormal display of character owing to intermediation by the clipboard 13.

Figure 28:
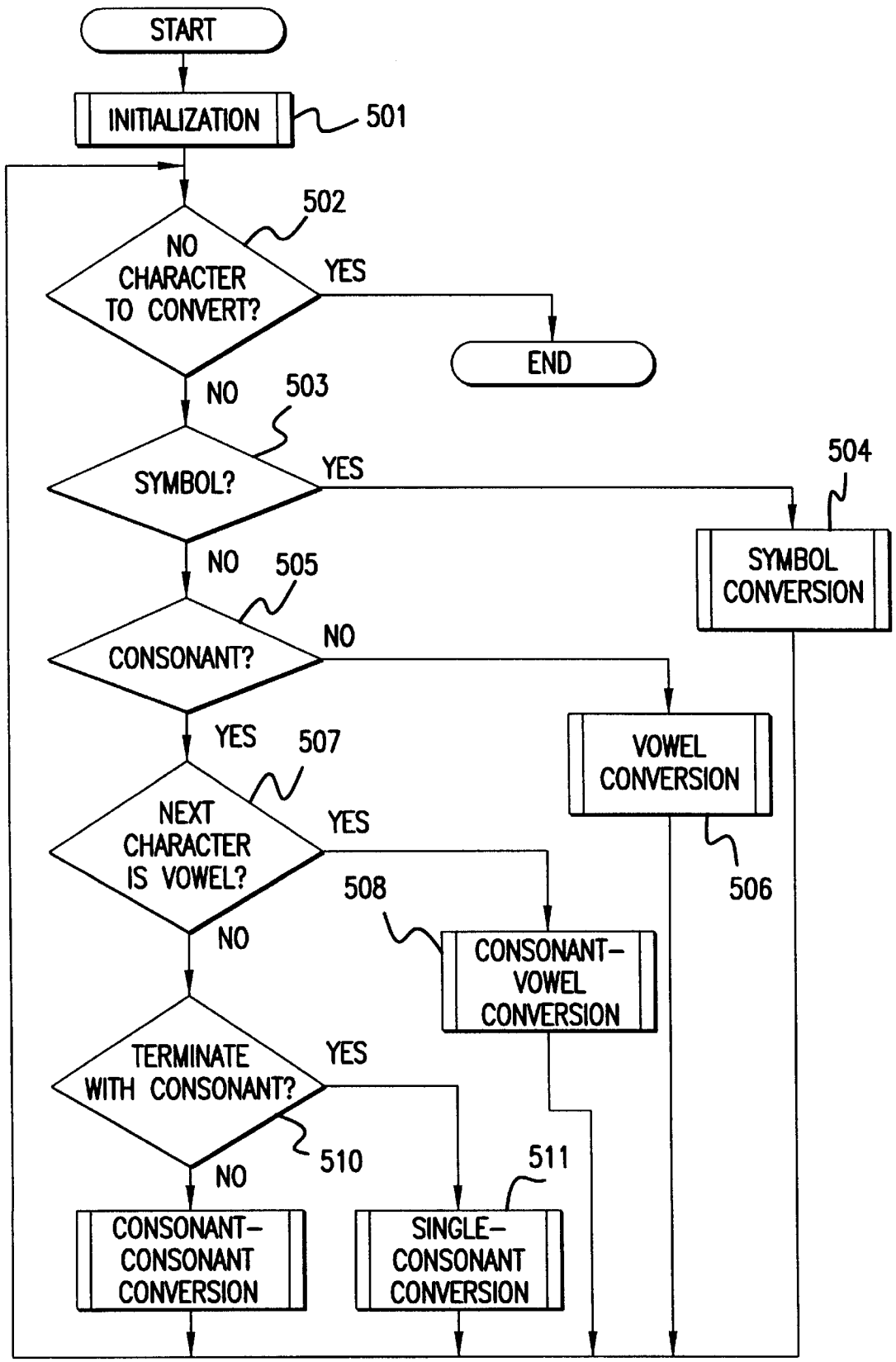
FIG. 28 is a flow chart illustrating an algorithm for a process of converting phonetic symbols into katakana notation in a character code conversion component.

FIG. 28 is a flow chart illustrating an algorithm for the process of converting the phonetic symbols to the katakana notation by the character code conversion means 5. The flow of the process of converting the phonetic symbols to katakana notation is now described referring to the flow chart.

In FIG. 28, when the string with the font number 251 is received at the character code conversion means 5, initialization such as clearing the buffer for storing the converted string or setting a starting position for reading the string to be converted is carried out (step 501). Some phonetic symbols represent consonants and others represent vowels, and besides, in the electronic dictionary of the present embodiment, it is assumed that the phonetic symbols include brackets, commas and so on.

If there is no string to be read at this point (step 502), the process of character code conversion is terminated.

If there is any string to be read, a single character is fetched from the string and examined as to whether it is a symbol or not (step 503). In the case of a symbol, a symbol conversion process is carried out (step 504). The reading position of the string is incremented as the symbol conversion process is finished, and the process returns to check whether characters to be read are left.

FIG. 29 is an example of lookup table for the symbol conversion process, which indicates that the symbol conversion process can be realized with ease by referring to the lookup table or the like.

Next, it is examined whether the fetched character is a consonant (step 505). If it is not a consonant, that is, the fetched character is a phonetic symbol indicating a vowel, vowel conversion process is executed (step 506). After the process, the reading position of the string is incremented, and the process returns to check whether there are characters to be read.

FIG. 30 is an example of a lookup table for vowel conversion showing that the vowel conversion process can be realized with ease, like the symbol conversion process, by referring to the lookup table or the like.

If a fetched character is neither a symbol nor a vowel, it s a phonetic symbol indicating a consonant. In this case, it is examined whether the next character is a vowel (step 507). In the case where the next character is a phonetic symbol representing a vowel, consonant-vowel conversion is carried out (step 508). After consonant-vowel conversion, the reading position of the string is incremented by two characters, and the process returns to check whether there are characters to be read.

FIG. 31 is an example of lookup table for the consonant-vowel conversion showing that the consonant-vowel conversion process can be realized with ease, like the symbol conversion process and the vowel conversion process, by the method referring to the lookup table or the like. In the lookup table shown in FIG. 31, the phonetic symbols representing the vowels are classified into 6 types in accordance with the lookup table shown in FIG. 30. In practice, a lookup table matching to the number of the types of the vowels may be used, or the apparatus may be constructed so that the lookup table in FIG. 31 is referred to after the vowels have been converted into 6 types, referring to the lookup table in FIG. 30.

It is examined whether the character next to the fetched character is a consonant (step 509). If the next character is a symbol, or the string is terminated, it is indicated that the fetched character is pronounced as a single consonant. If the character next to the fetched character is a consonant, one of the processes for pronunciation of a single consonant and pronunciation of a combination of two consonants is carried out, which depends on whether two consonants are pronounced in combination or not. In the case of pronunciation of a single consonant, a single-consonant conversion is executed (step 511), and in the case of pronunciation of a combination of consonants, a consonant-consonant conversion is executed (step 510).

FIG. 32 is an example of a first lookup table for the single-consonant conversion, which shows that the single consonant conversion can be realized easily, like the consonant-vowel conversion process, symbol conversion process or the vowel conversion process, by referring to the lookup table or the like.

FIG. 33 is an example of a second lookup table for the single-consonant conversion which is different from that of the first lookup table in the case where the fetched character and the next character are consonants and they are not pronounced in combination.

After the single-consonant conversion (step 511), the reading position of the string is incremented, and the process returns to check whether there are characters to be read.

FIG. 34 is an example of a lookup table for the consonant-consonant conversion showing that the consonant-consonant conversion can be realized with ease by referring to the lookup table or the like, like the processes in the cases of single-consonant conversant, consonant-vowel conversion, symbol conversion or vowel conversion. The lookup table shown in FIG. 34 unifies the cases where the character next to the two consonants combined to be pronounced is a vowel and non-vowel. In the table, the column of "None" indicates the converted string in the case where the character next to the consonant is not a vowel.

In the case where the character next to the two consonants combined to be pronounced is a vowel, the consonant-consonant conversion is executed, and then the reading position of the string is incremented by three characters and the process returns to check whether there are more characters to be read. If the character next to two consonants combined to be pronounced is not a vowel, the consonant-consonant conversion is executed, and the reading position of the string is incremented by two characters, and the process returns to check whether there are characters to be read.

As described above, the phonetic symbols are converted into the katakana notation. In this embodiment, the method of converting phonetic symbols into katakana notation by referring to the lookup table is explained as an example, but the apparatus may be constructed so that the spelling of the word is also referred to as disclosed in Japanese Patent Application Unexamined Publication No. Hei. 4-10052 (1992).

FIG. 35 is an example of conversion of all output string shown in FIG. 24 by the character code conversion process.

As a result of the character code conversion process, the string displayed as "1DtW" in the normal code set as shown in FIGS. 25 and 26 is converted into the string レタ and transferred to the input buffer. As shown in FIG. 20, in the electronic dictionary of this embodiment, it is possible to retrieve the entry word "letter" using the keyword レタ which is the katakana notation of pronunciation, and accordingly, レタ can be used in re-retrieval process as the input string.

Moreover, it is practical to retrieve homonyms having the same katakana notation of pronunciation. In the case of ロード the words "laud", "load", "lode", "lord", "road" and "rode" can be obtained as the result of retrieval.

The above descriptions are examples for explanation for operations in selecting and copying the part of phonetic symbols. The apparatus may be constructed so that a copying operation is automatically executed, as well as in the case of a retrieval instruction.

Figure 36:
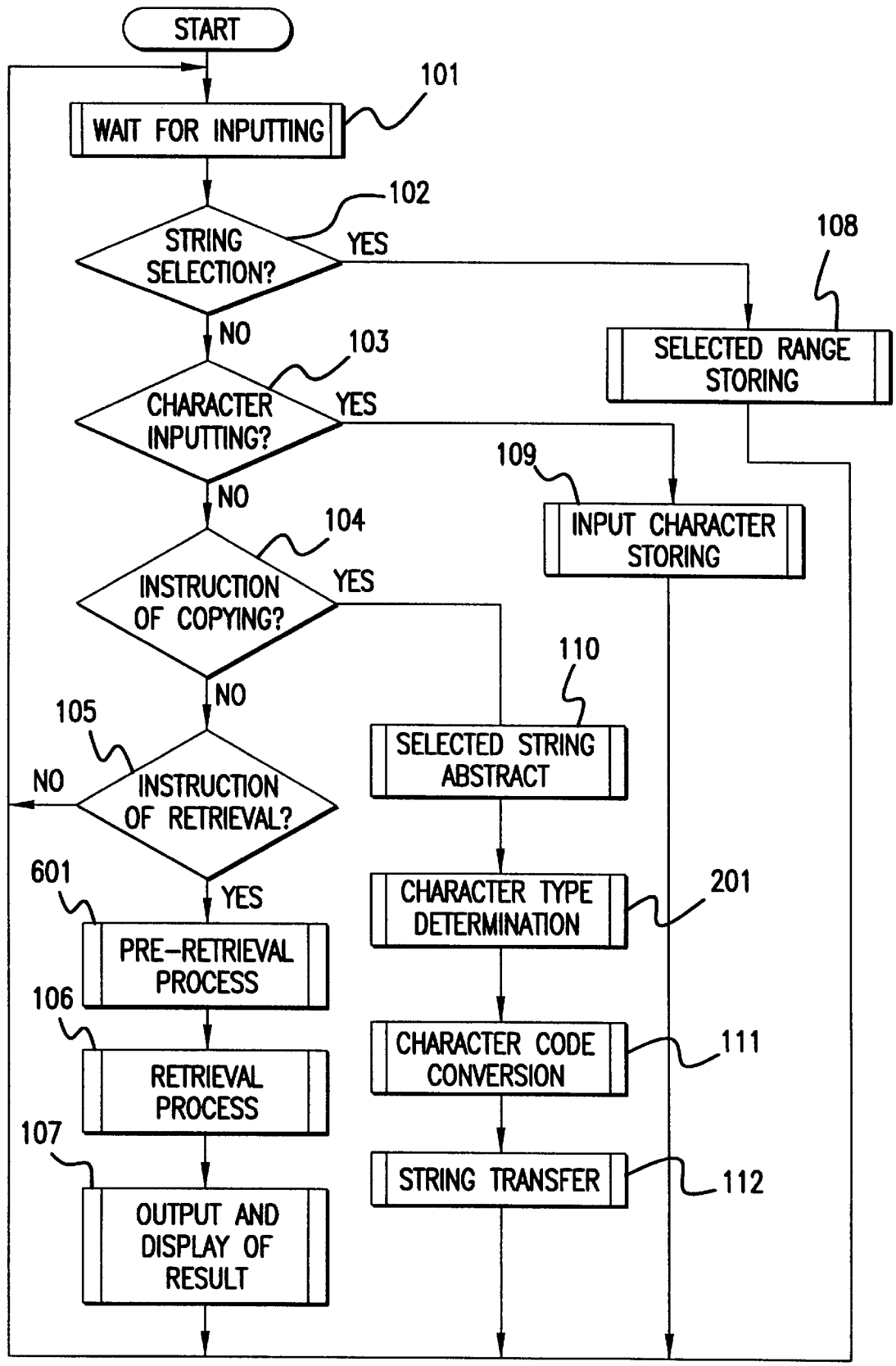
FIG. 36 is a flow chart schematically showing operations in the case where the apparatus is constructed so that copying operation is automatically executed in retrieving operation.

FIG. 36 is a flow chart illustrating operations in the case where the -apparatus is constructed so that the copying operation is automatically executed in the retrieving operation. The contents of each process shown in FIG. 36 are the same as those of the f low chart shown in FIG. 3, except that a pre-retrieval process (step 601) is added.

Figure 37:
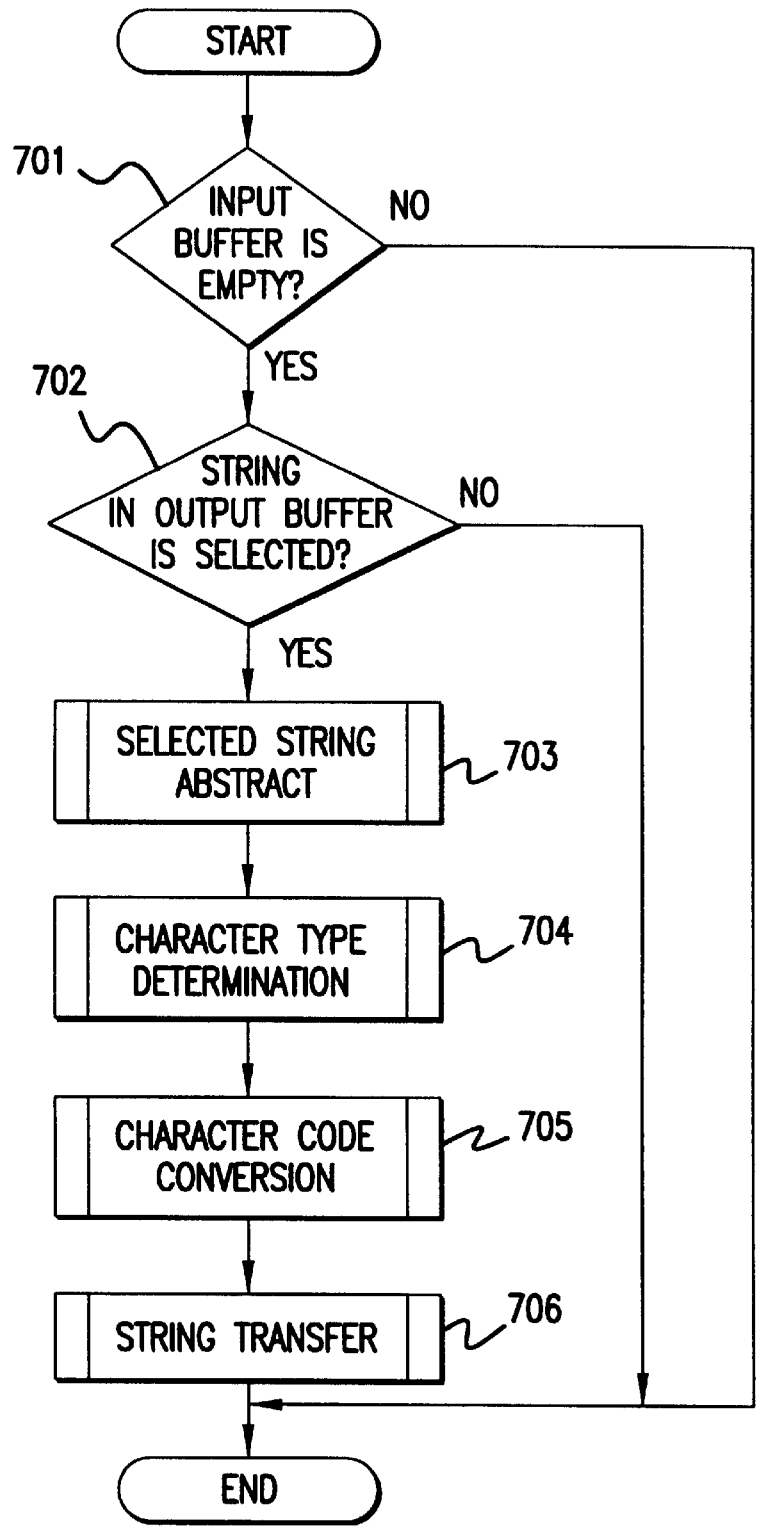
FIG. 37 is a flow chart illustrating an algorithm for a pre-retrieval process.

In the pre-retrieval process, it is determined where the keyword string to be used for retrieval exists and the string is transferred to the retrieval process. The operations of the pre-retrieval process are shown in a flow chart in FIG. 37.

At first it is investigated whether the data as the retrieval keyword, namely, whether the string is in the input buffer or not (step 701). If the string is stored in the input buffer, the pre-retrieval process is terminated without any operation.

If the input buffer is empty, whether a string in the output buffer is selected is investigated (step 702). In the case where no string in the output buffer is selected, the pre-retrieval process is terminated without any operation. In this case, there is no keyword to be used for retrieval; therefore, the apparatus may be constructed so that an alert is displayed to the effect that the retrieval is impractical.

If the input buffer is empty and some string in the output buffer is selected, the selected string abstract process (step 703), the character type determination process (step 704), the character code conversion process (step 705) and the string transfer process (step 706) are executed in this order. After the string is transferred to the input buffer, the pre-retrieval process is terminated. These processes are completely the same as those for the copying instruction, whereby it is possible to directly execute retrieval by selecting the string without provision of copying instruction.

The algorithm of the different code string copying operation shown in this embodiment can be implemented by a program which can be stored in a recording medium as a physical substance, for example, a floppy-disk or CD-ROM. The program stored in the recording medium is read by a computer, and controls the computer when used in it.

As described so far, according to the present invention, the output string can be reused as the input string for re-retrieval without labor of repeated input processes. Moreover, though a string of a code set unacceptable as the input string is copied for inputting, problems such as the change into different characters, which generates senseless string or abnormal display, do not occur. If the different code string copying apparatus of the present invention is applied to the Japanese front end processor, it is possible to avoid useless re-inputting of an incorrectly fixed string. If applied to the case of outputting the phonetic symbols, the user who has poor knowledge of phonetic symbols can understand how to pronounce a word by katakana notation of pronunciation and can transfer the string to other machine having no font for phonetic symbols. Besides, though the user has poor knowledge of phonetic symbols, the retrieval using the pronunciation is available by converting the phonetic symbols into katakana notation. It is also practical to execute retrieval of homonyms having the same pronunciation in katakana notation.

The foregoing description of preferred embodiments of this invention has been presented for purposes of illustration and description. It is not intended to be exhaustive or to limit the invention to the precise form disclosed, and modifications and variations are possible in light of the above teachings, or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A different code string copying apparatus comprising:
   an input buffer for storing a first string expressed by a first code set used in a first application process;
   an output buffer for storing a second string expressed by a second code set used in a second application process;
   selection means for selecting a part of said first string stored in said input buffer in accordance with a user's selecting instruction;
   transfer instruction means for accepting the user's transfer instruction for said string selected by said selection means;
   storing means for storing said first string expressed by said first code set and said second string expressed by said second code set corresponding to said first string in connection with each other;
   retrieving means for retrieving said string selected by said selection means from said first string expressed by said first code set and stored in said storing means in accordance with said transfer instruction accepted by said transfer instruction means;
   character code conversion means for fetching said second string expressed by said second code set corresponding to said string retrieved by said retrieving means; and
   transfer means for transferring said second string fetched by said character code conversion means to said output buffer,
   wherein said fetched second string is converted into a character code set reusable by the user as an original input string.

2. The different code string copying apparatus according to claim 1, wherein said input buffer further stores a font number representing a code set of characters stored therein for each character, and the copying apparatus further comprises:
   determination means for determining that said first code set of said string selected by said selection means is different from said second code set of said second string stored in said output buffer if said font number can be used in said first application process but cannot be used in said second application process,
   wherein said retrieving means executes retrieval if said first code set of said string selected by said selection means is determined to be different from said second code set of said second string stored in said output buffer.

3. The different code string copying apparatus according to claim 2, wherein
   said second string expressed by said second code set stored in said storing means and said first string expressed said first code set represent different languages but have the same meaning.

4. The different code string copying apparatus according to claim 2, wherein
   said first string expressed by said first code set comprises phonetic symbols and said second string expressed by said second code set comprises Japanese katakana characters indicating pronunciation corresponding to said phonetic symbols.

5. An electronic dictionary having an input buffer for storing an input string expressed by a first code set, an output buffer for storing a string expressed by a second code set to be displayed, dictionary data storing means for storing dictionary data, retrieval instruction means for accepting a user's retrieval instruction for said string stored in said input buffer, retrieval means for retrieving said string stored in said input buffer from said dictionary data in accordance with said retrieval instruction accepted by said retrieval instruction means and transfer means for transferring said string retrieved by said retrieval means to said output buffer, comprising:
   said input buffer further storing a font number representing a code set of stored characters for each character;
   code conversion table storing means for storing a first string expressed by a first code set and a second string expressed by a second code set corresponding to said first string in connection with each other;
   determination means for determining whether said code set of said string stored in said input buffer is different from a code set of character constituting said dictionary data;
   said retrieval means fetching said second string expressed by said second code set corresponding to said string stored in said input buffer from said code conversion table storing means if said determination means determines that said code set of said string stored in said input buffer is different from said code set of said characters constituting said dictionary data, and retrieving said fetched string expressed by said second code set from said dictionary data,
   wherein the fetched second string is converted into a character code set reusable by the user as an original input string.

6. An electronic dictionary having an input buffer for storing an input string expressed by a first code set, an output buffer for storing a string expressed by a second code set to be displayed, dictionary data storing means for storing dictionary data, retrieval instruction means for accepting a user's retrieval instruction for said string stored in said input buffer, retrieval means for retrieving said string stored in said input buffer from said dictionary data in accordance with said retrieval instruction accepted by said retrieval instruction means, and transfer means for transferring said string retrieved by said retrieval means to said output buffer, comprising;

said output buffer further storing a font number representing a code set of a string stored as a result of retrieval for each character;

selection means for selecting a part of said string stored in said output buffer in accordance with the user's selecting instruction;

determination means for determining whether said code set of said string selected by said selection means is different from a code set of characters constituting said dictionary data;

code conversion table storing means for storing a first string expressed by a first code set and a second string expressed by a second code set corresponding to said first string in connection with each other;

code set conversion means for fetching a string expressed by said second code set corresponding to said string stored in said output buffer from said code conversion table storing means if said determination means determines that said code set of said string selected by said selection means is different from said code set of characters constituting said dictionary data; and said retrieval means executing re-retrieval of the fetched string expressed by said second code set from said dictionary data.

7. A different code string copying method using a different code string copying apparatus that has an input buffer storing a first string expressed by a first code set used in a first application process and a font number representing said code set of said first string, an output buffer storing a second string expressed by a second code set used in a second application process, and storing means for storing said first string expressed by said first code set and said second string expressed by said second code set corresponding to said first string in connection with each other, the method comprising the steps of:

(a) selecting a part of said first string stored in said input buffer in accordance with a user's selecting instruction;

(b) accepting the user's transfer instruction for said string selected in step (a);

(c) determining that said code set of said string selected by said selection means is different from said second code set stored in said output buffer if said font number can be used in said first application process but cannot be used in said second application process;

(d) retrieving said string selected in step (a) from said string expressed by said first code set stored in said storing means, in accordance with said transfer instruction accepted in step (b) when said code set of said string selected by said selection means is determined to be different from said second code set stored in said output buffer in step (c);

(e) fetching a string expressed by said second code set and corresponding to said string retrieved in step (d); and (f) transferring said string expressed by said second code set fetched in step (e) to said output buffer for subsequent use by the user as an input string.

8. A recording medium readable by a computer having an input buffer storing a first string expressed by a first code set used in a first application process, an output buffer storing a second string expressed by a second code set used in a second application process and storing means for storing said first string expressed by said first code set and said second string expressed by said second code set corresponding to said first string in connection with each other, said recording medium storing a program for making said computer copy a string from said first application process to said second application process, said program including instructions for executing the following steps of:

selecting a part of a string stored in said input buffer in accordance with a user's selecting instruction;

accepting the user's transfer instruction for said selected string;

determining that said code set of said string selected in said step of selecting is different from said second code set stored in said output buffer if a font number of said selected string can be used in said first application process but cannot be used in said second application process;

retrieving said selected string from said first string expressed by said first code set stored in said storing means in accordance with said accepted transfer instruction if said code set of said string selected in said step of selecting is determined to be different from said second code set stored in said output buffer;

fetching a string expressed by said second code set and corresponding to said string retrieved in said step of retrieving; and transferring said fetched string expressed by said second code set to said output buffer for subsequent use by the user as an input string.

* * * * *